US012439972B1

(12) United States Patent
Bajpai et al.

(10) Patent No.: US 12,439,972 B1
(45) Date of Patent: Oct. 14, 2025

(54) ELECTRONIC VAPORIZING MODULE AND DEVICE

(71) Applicant: Puff Corporation, Los Angeles, CA (US)

(72) Inventors: Avinash Bajpai, Los Angeles, CA (US); Charlton Huang, Los Angeles, CA (US); Siddhant Waghmare, Los Angeles, CA (US); Andre Sumian, Los Angeles, CA (US); Matthew Cruz, Los Angeles, CA (US)

(73) Assignee: Puff Corporation, Los Angeles, CA (US)

( * ) Notice: Subject to any disclaimer, the term of this patent is extended or adjusted under 35 U.S.C. 154(b) by 0 days.

(21) Appl. No.: 19/040,156

(22) Filed: Jan. 29, 2025

Related U.S. Application Data

(60) Provisional application No. 63/705,493, filed on Oct. 9, 2024.

(51) Int. Cl.
A24F 40/485 (2020.01)
A24F 40/10 (2020.01)
A24F 40/46 (2020.01)

(52) U.S. Cl.
CPC ............ *A24F 40/485* (2020.01); *A24F 40/10* (2020.01); *A24F 40/46* (2020.01)

(58) Field of Classification Search
None
See application file for complete search history.

(56) References Cited

U.S. PATENT DOCUMENTS

| D779,722 S | 2/2017 | Volodarsky |
| 10,188,145 B2 | 1/2019 | Rado |
| 10,517,334 B1 | 12/2019 | Volodarsky et al. |
| 10,806,179 B2 | 10/2020 | Bajpai et al. |
| 2017/0027224 A1 | 2/2017 | Volodarsky |

(Continued)

FOREIGN PATENT DOCUMENTS

CN 115517406 A * 12/2022

OTHER PUBLICATIONS

CN-115517406-A English Translation obtained from Espacnet, pp. 1-17 (Year: 2022).*

(Continued)

*Primary Examiner* — Philip Y Louie
*Assistant Examiner* — Madeleine P Delacruz
(74) *Attorney, Agent, or Firm* — Bryan Cave Leighton Paisner LLP

(57) ABSTRACT

An electronic vaporizing device is provided having a housing defining an interior chamber having an upper interior chamber portion and a lower interior chamber portion, a removable mouthpiece having an inhalation outlet in communication with the upper interior chamber portion, a container configured to receive a vaporizable product within the lower portion of the interior chamber, the container having one or more container sidewalls having an inner surface and a bottom wall, a heating element configured to be electrically connected to a power source to heat the product and form a vapor therefrom, and a gas inlet configured to introduce a flow of gas into the container, wherein the gas inlet is configured to direct the flow of gas towards an inner surface region of the container. A vaporizing module for an electronic vaporizing device is also provided.

30 Claims, 14 Drawing Sheets

(56) References Cited

U.S. PATENT DOCUMENTS

2019/0297946 A1\* 10/2019 Fu .......................... A24F 40/46
2021/0030064 A1 2/2021 Bajpai et al.
2022/0240589 A1\* 8/2022 Liu .................... B05B 17/0653

OTHER PUBLICATIONS

YouTube "Yocan Black Phaser Ace 2 First impressions Do Over," posted Sep. 7, 2024, retrieved from https://www.youtube.com/watch?v=Y75urFJDQNg on Oct. 23, 2024.
Yocan Black Phaser Ace 2, retreived from https://www.yocanvaporizer.com/products/yocan-black-phaser-ace-2-concentrate-vaporizer on Oct. 4, 2024.
Focus V Aeris, retrieved from https://focusv.com/pages/aeris?srsltid=AfmBOoq_Id1KO_NxLv6NtJiJ20RO_flmwjnqzDlw6SdRFWdcnUuHegiH on Oct. 23, 2024.
Yocan Orbit Vaporizer Pen, retrieved from https://www.yocanvaporizer.com/products/yocan-orbit-vaporizer-pen on Oct. 23, 2024.
Divine Crossing Lightning Pen, reviewed online by customer on Nov. 13, 2022.
Quartz Banger with Spinner Carb Cap and Terp Pearls, retrieved from https://quartzbanger.com/terp-pearls-carb-cap-combo-14mm-male-90-degree-quartz-banger-3-piece-kit/ on Oct. 24, 2024.
High Five Double Helix Carb Cap, retrieved from https://dankgeek.com/products/high-five-double-helix-carb-cap on Oct. 24, 2024.
Disk Spinner Carb Cap, retrieved from https://www.quartzbangers.com/products/disk-spinner-carb-cap on Oct. 24, 2024.

\* cited by examiner

ELECTRONIC VAPORIZING MODULE AND DEVICE

CROSS REFERENCE TO RELATED APPLICATIONS

The present application claims benefit of U.S. Provisional Patent Application Ser. No. 63/705,493, filed on Oct. 9, 2024. The entire content of the aforementioned application is hereby incorporated by reference.

FIELD OF THE INVENTION

Aspects of the present invention relate to electronic vaporizing devices and modules for use with vaporizable products.

BACKGROUND

Electronic vaporizers are commonplace and are generally utilized for purposes of aroma and/or inhalation therapy. Vaporizers heat a substance, such as herbal or plant material, including for example tobacco, *cannabis*, lavender, chamomile, and other materials. Electronic vaporizers use electrical energy to heat the substance through the use of direct heat or the use of hot air. Some examples of heating processes used by an electronic vaporizer can include thermal conduction, thermal radiation, and thermal convection, and inductive heating can also be utilized. Heating of the substance creates a vapor that can be inhaled for therapeutic or other pleasing effect.

Increasingly, consumers are seeking electronic vaporizers that are compact and portable, to allow consumers to utilize the vaporizers in a variety of different settings and on the go, while also providing excellent vapor quality and volume, in order to impart the desired therapeutic and/or pleasurable effects. However, it can be difficult to devise electronic vaporizers that are compact enough to be portable for easy use, while also providing a good overall vapor production and inhalation experience.

Accordingly, there remains a need for electronic vaporizers that are portable and convenient, that provide excellent vapor product characteristics in a compact form.

SUMMARY

Aspects of the disclosure are directed to an electronic vaporizing device comprising: a vaporizing module comprising: a housing defining an interior chamber having an upper interior chamber portion and a lower interior chamber portion; a removable mouthpiece having an inhalation outlet in communication with the upper interior chamber portion; a container configured to receive a vaporizable product within the lower portion of the interior chamber, the container having one or more container sidewalls and a bottom wall, and the container having a longitudinal axis extending along a vertical direction of the electronic vaporizing device, and a horizontal axis that is perpendicular to the longitudinal axis; a heating element configured to be electrically connected to a power source to heat the product and form a vapor therefrom; and a gas inlet configured to introduce a flow of gas into the container; and a gas inlet configured to introduce a flow of gas into the container, the gas inlet comprising a first opening, a second opening, and a gas inlet conduit connecting the first opening to the second opening. The gas inlet is configured to direct the flow of gas (i) downwardly with a vertical angle of at least 20° with respect to the horizontal axis, and towards an inner surface region of the container, and (ii) with a horizontal component of the flow having an angle of incidence that is within a range of from 5 to 60 degrees, wherein the angle of incidence corresponds to the angle between the median of the horizontal component of the flow directed towards the inner surface region, with respect to an imaginary tangent line drawn through a point that intersects with the inner surface region, as measured in a horizontal plane taken at a vertical height of the container that contains the point of intersection. According to certain embodiments, the vaporizing module is configured to provide an open state where an upper housing portion that at least partly defines the upper interior chamber portion is removed from a lower housing portion that at least partly defines the lower interior chamber portion, and a closed state where the upper housing portion is sealed to the lower housing portion. According to certain embodiments, the device further includes a base portion that is removably attachable to the vaporizing module, the base portion housing one or more components for electrically connecting to the power source to supply power to the heating element. According to certain embodiments, the device is configured such that the vaporizing module can be removed from the base portion while the vaporizing module is in the closed state. In operation of the electronic vaporizing device, according to certain embodiments, vaporizable product received in the container is heated by the heating element, becomes entrained in the flow of gas directed by the gas inlet into the container, and the flow of gas having the vaporized product entrained therein flows out of the container and through the upper portion interior chamber portion to flow out of the inhalation outlet of the mouthpiece. According to certain embodiments, the container is accessible for refill or repair by removal of the mouthpiece.

According to another aspect of the invention, a method of using the portable electronic vaporizing device disclosed herein is provided. The method comprises using the electronic vaporizing device corresponding to any of the embodiments described herein, by providing vaporizable product to the container; activating the heating element to heat the vaporizable product in the container to at least partly vaporize the product; and inhaling gas entrained with the vaporizable product from the inhalation outlet of the mouthpiece.

According to another aspect of the invention, a vaporizing module for a vaporizing device is provided. The vaporizing module includes a mouthpiece having an inhalation outlet, a housing comprising a cap portion comprising a portion of an upper interior chamber, and a body portion comprising a portion of a lower interior chamber, and wherein (i) the cap portion is releasably sealable to the body portion via an attachment feature, and (ii) the cap portion is connected to the body portion by a tether; a container configured to receive a vaporizable product within the body portion of the housing, the container having one or more container sidewalls and a bottom wall, the container having a longitudinal axis extending along a vertical direction of the container, and a horizontal axis that is perpendicular to the longitudinal axis; a heating element configured to be electrically connected to a power source to heat the product in the container and form a vapor therefrom during operation of the vaporizing device; and a gas inlet comprising a first opening, a second opening, and a gas inlet conduit connecting the first opening to the second opening, wherein, the first opening of the gas inlet is located in a region of an external surface of the housing that is vertically above the container when the cap portion is sealed to the body portion, and wherein the gas inlet is configured to introduce a flow of gas into the container of the vaporizing device, and wherein the gas inlet is configured to direct the flow of gas downwardly with a vertical angle of at least 20° with respect to the horizontal axis, and towards an inner surface region of the container.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Aspects of the invention as described herein are directed to an improved portable electronic vaporizing device for the inhalation of vaporizable substances, such as aromatic substances, therapeutic substances and/or substances with physiological effects. Examples of such substances can include herbs, such as tobacco, *cannabis*, lavender, chamomile, and other types of plant material. In one embodiment, a vaporizable substance can comprise a cannabinoid, such as for example one or more of cannabadiol (a generally non-psychoactive therapeutic substance) and tetrahydrocannabinol (THC) (a psychoactive therapeutic substance). The vaporizable substance may in some embodiments be in the form of an oil and/or wax product comprising the vaporizable substance, e.g., as extracted from plant material containing the substance, and may optionally be provided in combination with carriers or other additives.

Figure 1A:
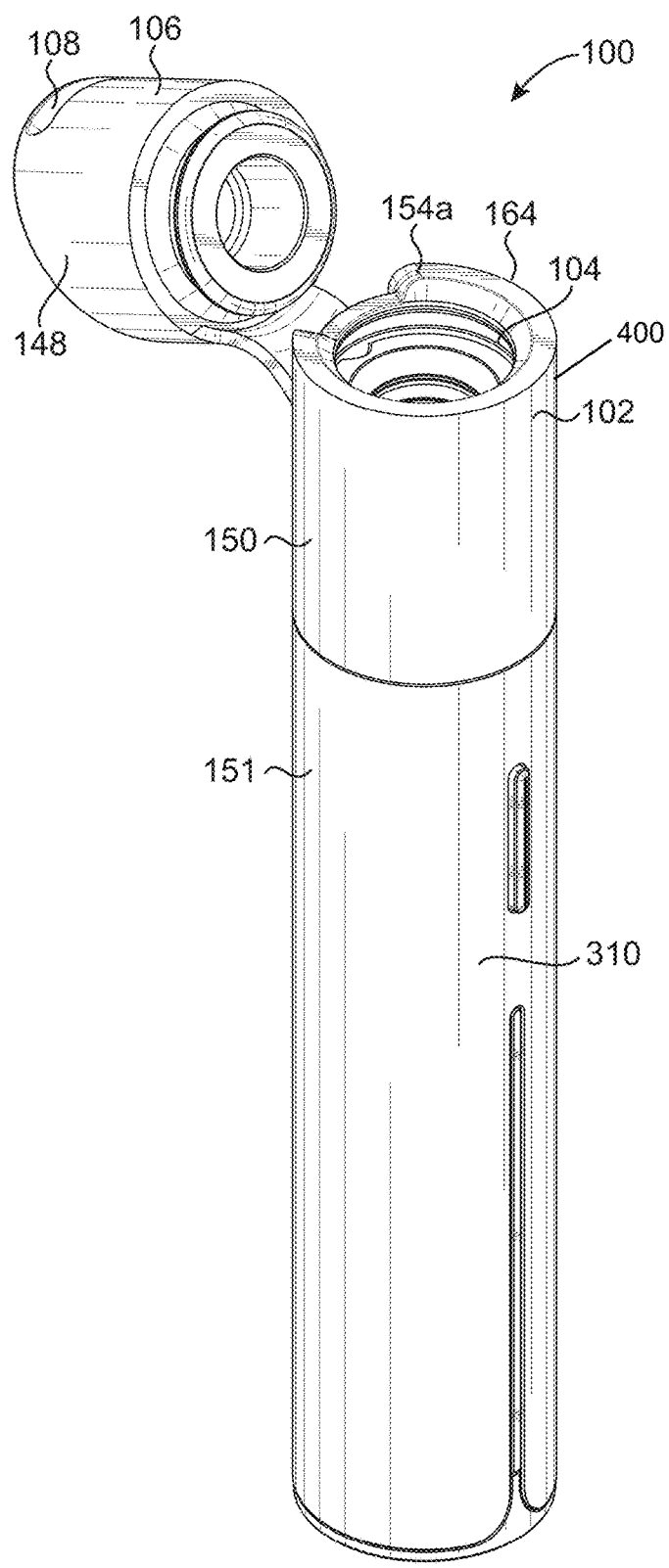
FIG. 1A shows a front perspective view embodiment of an electronic vaporizing device, in an open configuration.
Figure 1B:
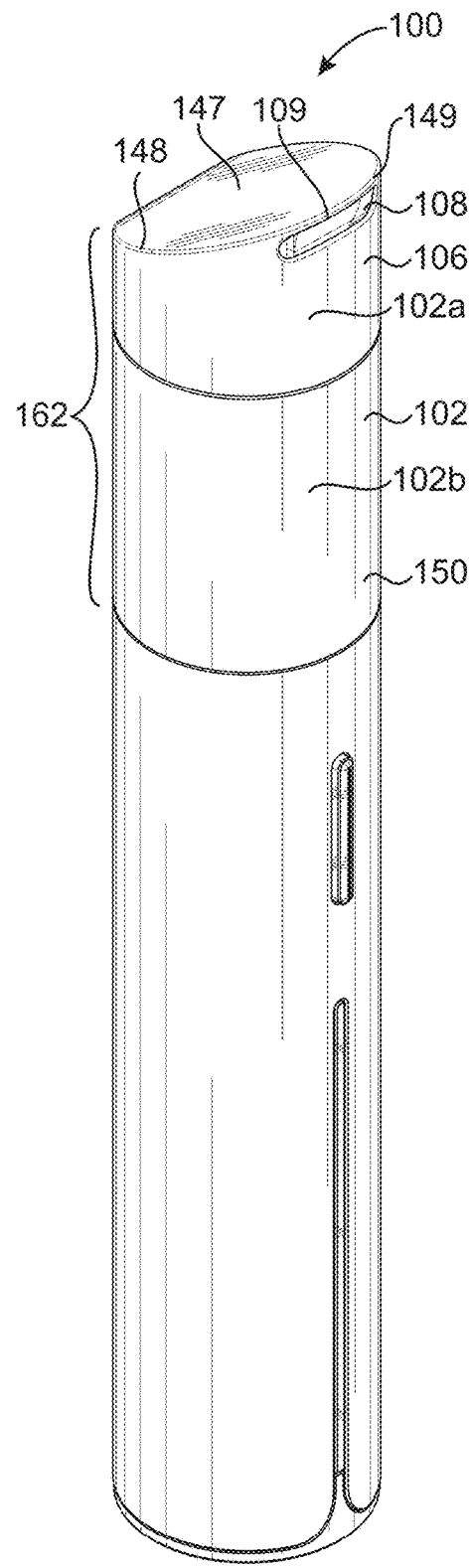
FIG. 1B shows a front perspective view of the embodiment of the electronic vaporizing device of FIG. 1A, in a closed configuration.
Figure 2A:
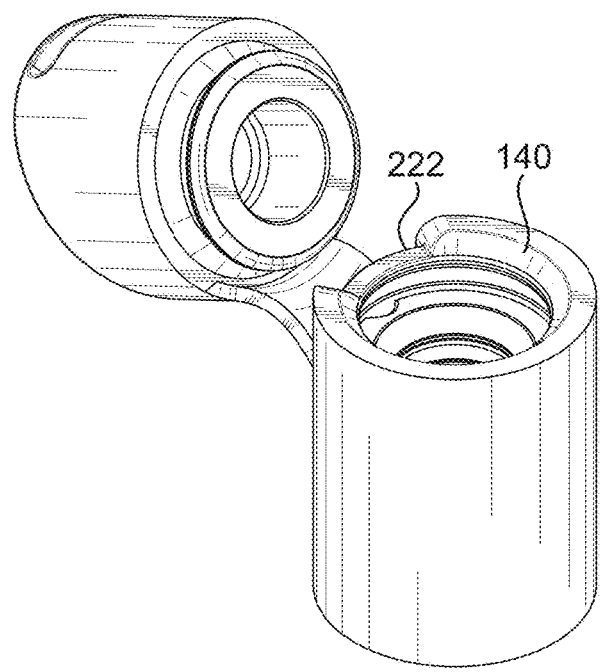
FIG. 2A shows a front perspective view of an embodiment of a vaporizing module.
Figure 2B:
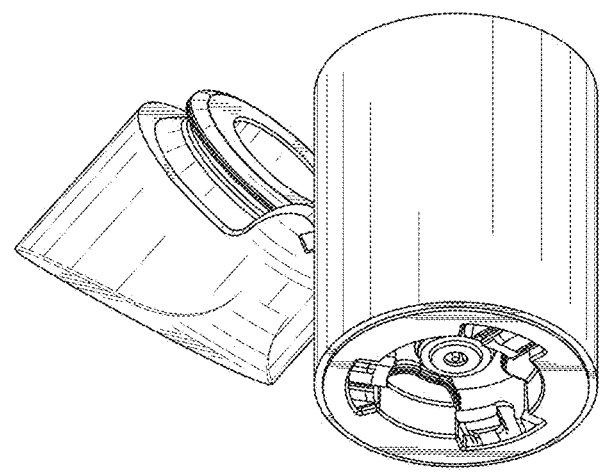
FIG. 2B is a bottom perspective view of the embodiment of the vaporizing module of FIG. 2A.
Figure 2C:
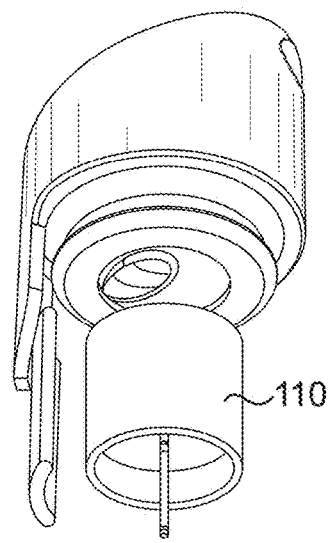
FIG. 2C is an exploded rear view of the embodiment of the vaporizing module of FIG. 2A and FIG. 2B.

Referring to FIGS. 1A and 1B, an embodiment of an electronic vaporizing device 100 is shown according to aspects of the disclosure herein, with FIG. 1A illustrating the device in an open position, and FIG. 1B illustrating the device in a closed position. The device 100 includes a housing 102 defining an interior chamber 104 having an upper interior chamber portion 104a and a lower interior chamber portion 104b (see FIG. 4A). The device 100 also includes a removable mouthpiece 106 having an inhalation outlet 108 (see also FIG. 4B) that is in communication with the upper interior chamber portion 104a. According to certain embodiments, the housing 102 of the device includes at least a portion of the removable mouthpiece 106, and the housing 102 may even encompass the entire removable mouthpiece 106. In the embodiment shown in FIG. 1A, the device has been opened by lifting the mouthpiece away from a top of the device, and in the embodiment shown in FIG. 1B, the mouthpiece has been closed over the top of the device, such as by engaging the mouthpiece with the portion of the housing that defines the lower interior chamber portion 104b.

Figure 4A:
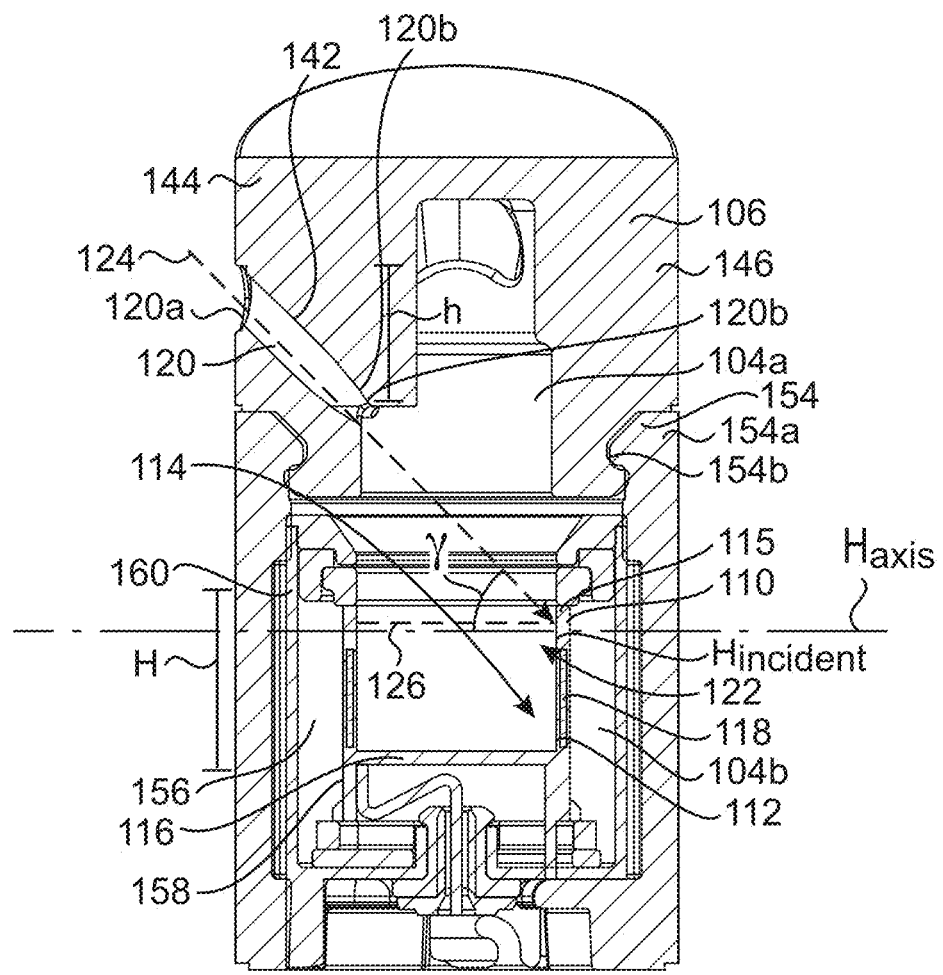
FIG. 4A is a cross-sectional view of the embodiment of the vaporizing module of FIG. 3A and FIG. 3B.
Figure 4B:
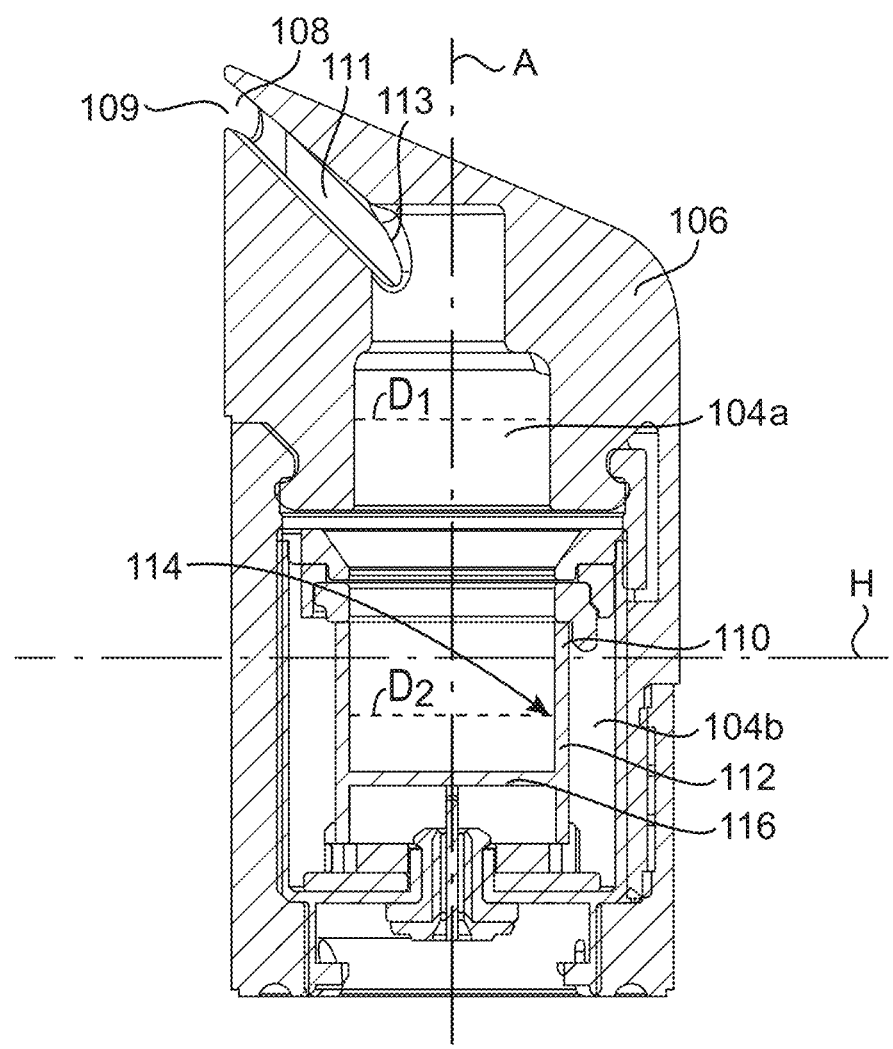
FIG. 4B is a cross-sectional view of the embodiment of the vaporizing module of FIG. 3A and FIG. 3B.

According to certain embodiments, the device 100 comprises a container 110 configured to receive a vaporizable product within the lower interior chamber portion 104b (see FIGS. 4A-4B). The container 110 can comprise one or more container sidewalls 112 an inner surface 114 (such as an inner surface of the one or more sidewalls), and a bottom wall 116. The container 110 comprises a longitudinal axis A that extends along, and is parallel with, a vertical direction (see FIG. 4B). According to certain embodiments, the longitudinal axis A may further extend through and be coaxial with the rest of the electronic vaporizing device 100, as shown in FIG. 4B, or in another embodiment, the longitudinal axis of the container may be offset from a longitudinal axis of the rest of the device, for example in a case where a major portion of the device extends obliquely away from the container 110. According to certain embodiments, the longitudinal axis A corresponds to the vertical axis of the container 110 when the container is in a position where it is upright and not tilted or angled towards the ground. With respect to the terms "horizontal" and "vertical" as used herein, as in a horizontal or vertical direction, or horizontal or vertical axis, it should be understood that these terms are used to describe directions along and/or orientations of the container and/or device in an upright position. Alternatively, the "longitudinal axis" or "vertical axis" can be understood as a "first axis", and the "horizontal axis" can be understood as a "second axis" that is perpendicular to the first axis, and where the vertical and horizontal directions can also be understood as first and second directions along the first and second axes that are perpendicular to one another, and other instances of "vertical" and "horizontal," with respect to orientations of structures or flows can likewise be understood as corresponding to "first" and "second," such as in a case where the container and/or device are not in an upright position. The terms "above" and "below" in referencing relative positions of structures or flows can also be understood as referring to relative positions along a first axis, in a case where the container and/or device are not in an upright position.

According to certain embodiments, the device 100 further comprises a heating element 118 (see FIG. 4A) that is configured to be electrically connected to a power source (e.g., an external power source such as an outlet, and/or an internal power source such as a battery provided as a part of the device) to heat the vaporizable product in the container 110 and form a vapor therefrom. To device 100 can further comprise, according to certain embodiments, a gas inlet 120 configured to introduce a flow of gas into the container 110, the gas inlet comprising a first opening 120a, a second opening 120b, and a gas inlet conduit 142 connecting the first opening to the second opening. In operation of the device 100, the heating element 118 heats the vaporizable product in the container 110, and upon a draw of gas from a user of the device on the inhalation outlet 108, a negative pressure within the interior chamber 104 is created that draws gas, such as ambient air, through the gas inlet 120 and into the container 110 where vaporized product becomes entrained therein, and the gas having the vaporized product entrained therein flows out of the container and through the upper interior chamber portion 104a to flow out the inhalation outlet 108 of the mouthpiece 106, where it can be inhaled by the user.

According to certain embodiments, the device 100 is configured to introduce gas into the container 110 at one or more angles and/or directions of flow that enhance vapor production from the vaporizable product in the container. Without being limited by any particular theory, it is believed that an angle and/or direction of flow of gas impinging upon the vaporizable product held in the container can be selected to push and/or or even at least partly circulate the product about the container, thereby increasing the surface area of the product and creating conditions suitable for increased vapor production. Specifically, according to certain embodiments, it may be desirable to contact a surface of the vaporizable product held within the container with an angle and/or direction of incident gas that moves the vaporizable product in an at least partly circular direction about the container, and without creating excessive turbulence via the gas introduction that might otherwise inhibit smooth flow of the product or create a disruption in the vapor production. According to certain embodiments, the angle and/or direction of flow of gas impinging upon the vaporizable product held in the container can be selected to reduce any "splashback" of the liquid product from the container, or in other words, to reduce the incidence and amount of liquid product that gets splashed out of the container and into the device interior, which splashed product can otherwise become stuck and even partially clog the device, and can otherwise impair the user experience. For example, according to certain embodiments, the device 100 may be capable of generating vapor from the vaporizable product by directing the flow of gas from the gas inlet 120 to the container 110 substantially without ejecting vaporizable product in liquid form from the container into the upper interior chamber portion 104a when it is contacted by the gas flow. Furthermore, according to certain embodiments, the device 100 may be configured to generate vapor from the vaporizable product without the presence in the container 110 of any movable physical structure capable of mechanically imparting kinetic energy to the vaporizable product in the container 110, such as without any beads, pearls, stir bars, or other structures that would push or otherwise mechanically agitate the vaporizable product in the in the container. That is, according to certain embodiments, the gas introduced into the container itself provides movement and circulation of the vaporizable product in the container.

According to one embodiment, the gas inlet 120 that introduces gas into the container 110 is configured to provide a suitable direction and/or angle of gas flow, to provide for enhanced vapor production. Referring to FIG. 4A, according to one embodiment, the gas inlet 120 is configured to direct the flow of gas (e.g. as depicted by the dashed line indicated by 124) downwardly from the inlet towards an inner surface region 122 container 110, such as an inner surface region of the one or more sidewalls 112. According to certain embodiments, the inner surface region 122 may be located at a vertical height above the bottom wall 116 of the container that the corresponds approximately to an average height of the vaporized product held in the container 110 (e.g., an average height of vaporized product when freshly loaded into the container). Thus, again without being limited to any particular theory, it is believed that the gas flow can be introduced downwardly and at any angle towards the inner surface region 122 of the one or more sidewalls 112 that is adjacent an interface with a top surface (e.g., as depicted by dashed line 126) of any vaporized product held in the container. According to certain embodiments, the flow of gas is directed to at least partly impinge against the inner surface region 122, such as when a level of vaporizable product held in the container is below the inner surface region. According to certain further embodiments, while the flow of gas may be directed towards the inner surface region 122, it may in operation at least partly impinge against the surface of any vaporizable product that may be disposed between the gas inlet 120 and the inner surface region 122, such as in a case where the vaporizable product level is vertically above the inner surface region 122 towards which the gas flow is directed. In yet another version, the flow of gas may impinge against both the inner surface region 122 and a surface of the vaporizable product held in the container 110 that is adjacent the inner surface region 122, such as when the level of vaporizable product is at about a same height as the inner surface region 122.

Figure 9A:
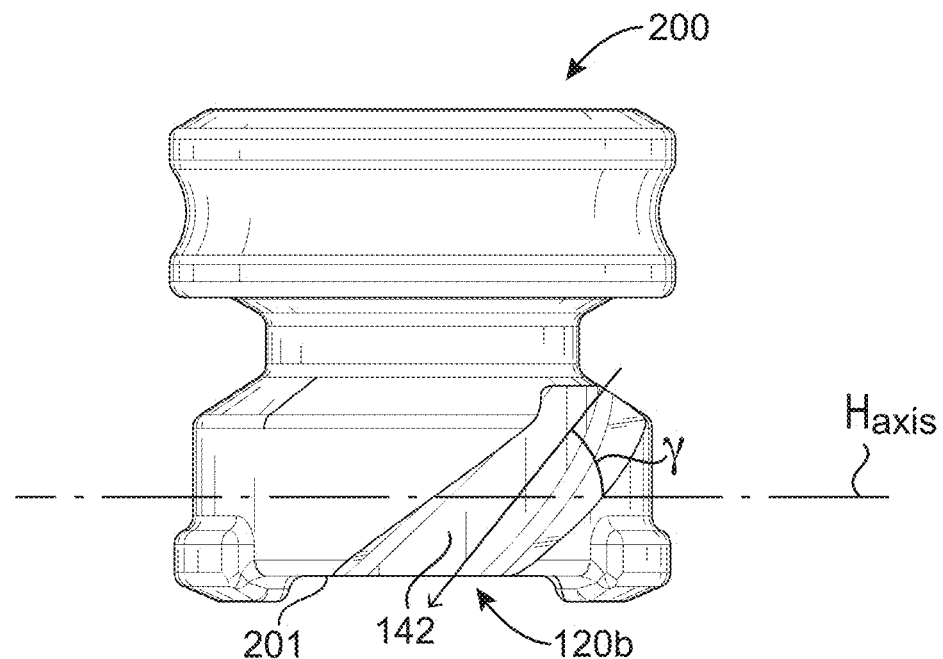
FIGS. 9A and 9B are a side view and a front perspective view, respectively, of an embodiment of an insert for an electronic vaporizing device.
Figure 9B:
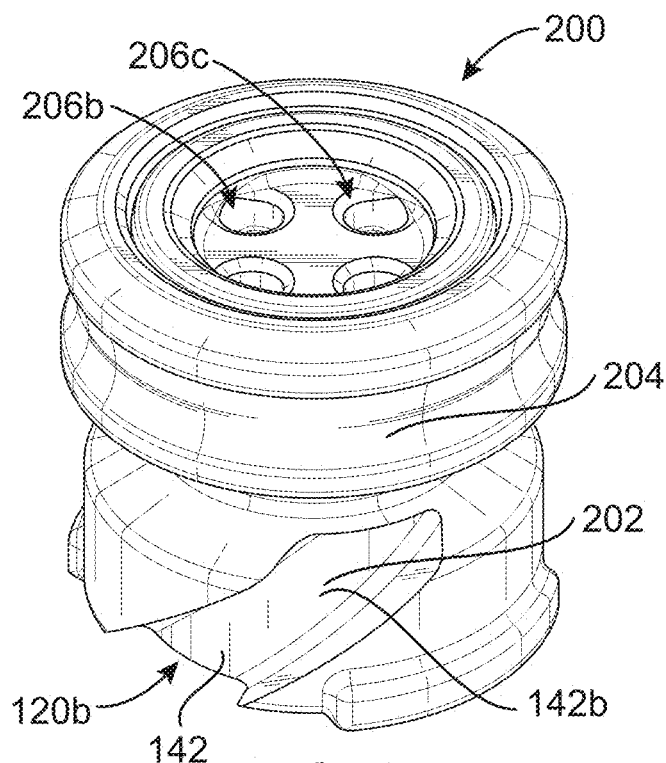

According to one embodiment, the gas inlet 120 is configured to direct the flow of gas 124 downwardly with a vertical angle γ (gamma) of at least 20° with respect to a horizontal axis (see $H_{axis}$ representing the horizontal axis in FIG. 4B and FIG. 9A) that is perpendicular to the longitudinal axis A, and towards the inner surface region 122 of the one or more sidewalls 112 of the container 110. According to one embodiment, the gas inlet 120 is configured to direct the flow of gas downwardly with a vertical angle γ with respect to the horizontal axis of at least at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62. According to another embodiment, the gas inlet 120 is configured to direct the flow of gas downwardly with a vertical angle γ with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

According to one embodiment, at least a portion, and even the entire the gas inlet conduit 142 is angled downwardly from the first opening 120*a* to the second opening 120*b*. For example, according to certain aspects, the at least a portion of the gas inlet conduit 142 can comprise a downward angle γ with respect to the horizontal axis that is at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62°. According to certain aspects, the at least a portion of the gas inlet conduit 142 can comprise a downward angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

According to one embodiment, the flow of gas directed by the gas inlet 120 into the container 110 has a median direction of flow with a downward angle γ with respect to the horizontal axis that is at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62°. According to another embodiment, the flow of gas directed by the gas inlet 120 into the container 110 has a median direction of flow with a downward angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°. According to certain embodiments, the downward angle of the flow of gas is imparted by a downward angle of at least a portion of the gas inlet conduit 142. According to certain other embodiments, the downward angle of the flow of gas can be imparted by a directing structure (not shown) provided as a part of the gas inlet 120 that is adjacent the second opening 120*b* and that directs the flow of gas exiting the second opening downwardly into the container 110.

According to one embodiment, the gas inlet conduit 142 has a height 'h' (see FIG. 4A) measured in a vertical direction parallel to the longitudinal axis (i.e., a vertical component of an overall gas path length of the gas inlet conduit), from the first opening 120*a* to the second opening 120*b*, that is at is at least 4 mm, at least 4.5 mm, at least 5 mm at least 5.5 mm, at least 6 mm, at least 6.5 mm, at least 7 mm, at least 7.5 mm, and/or at least 8 mm, and less than 10 mm, less than 9.5 mm, less than 9 mm, less than 8.5 mm, less than 8 mm, less than 7.5 mm, less than 7 mm, less than 6.5 mm, less than 6 mm, less than 5.5 mm and/or less than 5 mm. According to another embodiment, the gas inlet conduit 142 comprises an overall gas path length from the first opening 120*a* to the second opening 120*b* of at least 4 mm, at least 4.5 mm at least 5 mm, at least 5.5 mm, at least 6 mm, at least 6.5 mm, at least 7 mm, at least 7.5 mm, and/or at least 8 mm, and less than 10 mm, less than 9.5 mm, less than 9 mm, less than 8.5 mm, less than 8 mm, less than 7.5 mm, less than 7 mm, less than 6.5 mm, less than 6 mm, less than 5.5 mm and/or less than 5 mm.

In one embodiment, the inner surface region 122 that the gas inlet 120 is configured to direct the gas flow to is at least 1 mm above the bottom wall of the container 110, such as at least 2 mm, at least 2.5 mm, at least 3 mm, at least 5 mm, and/or at least 6 mm above the bottom wall of the container 110. The inner surface region 122 that the gas flow is directed to may also be a predetermined height below a top of the container 110. For example, the inner surface region 122 may be no more than 10 mm above the bottom wall 116 of the container 110, such as no more than 7 mm, no more than 6 mm, no more than 5 mm, no more than 4 mm and/or no more than 3 mm above the bottom wall 116 of the container. According to one embodiment, the gas inlet 120 is configured to direct the flow of gas at inner surface region 122 that is 1 mm to 10 mm above the bottom wall 116 of the container 110, such as between 2 mm to 7 mm, between 3 mm to 6 mm, and/or between 4 mm to 5 mm, above the bottom wall of the container. According to certain embodiments, the gas inlet 120 is configured to direct the flow of gas to an inner surface region 122 that is at least 1 mm from a top 115 of the container sidewall, such as at least 1.5 mm, at least 2 mm, at least 2.5 mm, and/or at least 3 mm from a top of the container sidewall 112.

According to yet a further embodiment, the gas inlet 120 may be configured to direct a flow of gas at inner surface region 122 that is above the bottom wall 116 by at least 10%, at least 15%, at least 20%, at least 25%, at least 30%, at least 40%, at least 50%, and/or at least 60% of the vertical height H of the one or more sidewalls 112. In another embodiment, the gas inlet 120 may be configured to direct a flow of gas at inner surface region 122 that is above the bottom wall 116 by no more than 90%, no more than 80%, no more than 75%, no more than 60%, no more than 50%, and/or no more than 40% of the vertical height H of the one or more sidewalls 112.

According to certain further embodiments, the flow of gas is directed towards the inner surface region 122, such as an inner surface region of the one or more sidewalls 112 at a horizontal angle that provides for enhanced vapor production. That is, according to certain embodiments, the flow of gas from the outlet 120 can be understood to have a vertical component, i.e. a downward component as described above (e.g. as shown by line 124 in FIG. 4A), and a horizontal component, towards the inner surface region 122 of the one or more sidewalls 112 of the container 100. Specifically, according to certain embodiments, the gas inlet 120 can be configured to introduce the flow of gas at a horizontal angle that facilitates movement and even circulation of the product in the container 110, to enhance vapor production. For example, the gas inlet 120 can be configured to introduce the flow of gas at a horizontal angle that minimizes turbulence and/or ricocheting of the gas from the sidewalls 112, such that the gas flow engages with a surface of the vaporizable product to at least partly move the vaporizable product along the direction of gas flow. According to certain embodiments, by providing a gas flow from the gas flow outlet 120 that has both the downward component and horizontal component of flow, the vaporizable product can be made to at least partly circulate and/or swirl in the container 110, which may increase the exposed surface area of the product and/or facilitate more uniform heating of the product, which in turn can lead to a favorable increase in vapor production.

Figure 5:
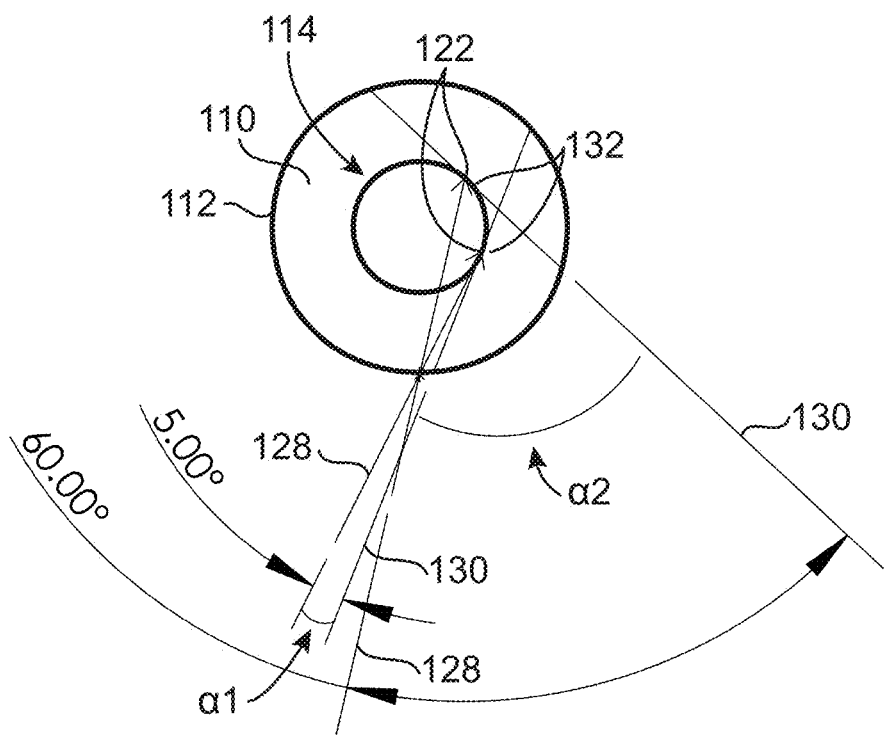
FIG. 5 is a schematic diagram illustrating an angle of incidence of gas flow towards an inner surface region of a container, according to one embodiment.

Referring to FIG. 5, which is a cross-section showing the gas flow into the container 110 as viewed from above, according to certain embodiments, the gas flow outlet is configured to direct the flow of gas with a horizontal component 128 of the flow that has an angle of incidence α with respect to the inner surface region 122 that is within a predetermined range. As shown in FIG. 5, the angle of incidence corresponds to an angle formed between (i) a median of the horizontal component of flow (e.g. a primary flow component in the horizontal direction), that is directed towards the inner surface region 122 of the one or more sidewalls 112, and (ii) an imaginary tangent line 130 that is tangent to the inner surface 114 of the one or more container sidewalls 112 and that is drawn through a point 132 that intersects with the inner surface region 122. FIG. 5 shows two such angles of incidence α1 and α2, with α1 corresponding to a smaller angle of incidence than α2 (FIG. 5 depicts angles of α1=5° and α2=60°, but the angle of incidence is not limited thereto). The angle of incidence α can be measured in a horizontal plane of the container at a vertical height that contains the point 132, or in other words in a horizontal plane taken at a height of the container that corresponds to the height $H_{incident}$ of the point 132 (e.g., the height of the inner surface region 122 against which the flow of gas is directed, see FIG. 4A).

According to certain embodiments, the angle of incidence α is significantly less than 90°, such as to avoid ricochet and turbulence that may be caused by direct impingement of the gas flow against the inner surface 114 of the container 110. For example, the angle of incidence α may be no more than 75°, no more than 70°, no more than 65°, no more than 60°, no more than 55°, and/or no more than 50°. According to certain embodiments, the angle of incidence α may be at least 3°, such as at least 5°, at least 8°, at least 10°, at least 15°, at least 20°, at least 25°, at least 30°, at least 35°, at least 40°, and/or at least 45°. In certain embodiments, the angle of incidence α may be within a range of from 10° to 75°, such as from 30° to 60°, from 45° to 55°, and/or from 48° to 50°.

FIGS. 6A-6D show the flow of gas from the gas inlet 120 into the container 110 in the device 100, as seen from a top view (FIG. 6A), perspective top views from the both right and left sides (FIGS. 6B and 6C), and a side view (FIG. 6D), where a portion of the device 100 about the gas inlet 120 has been rendered transparent to show the flow of gas 124 therethrough and towards the container 110.

Figure 7A:
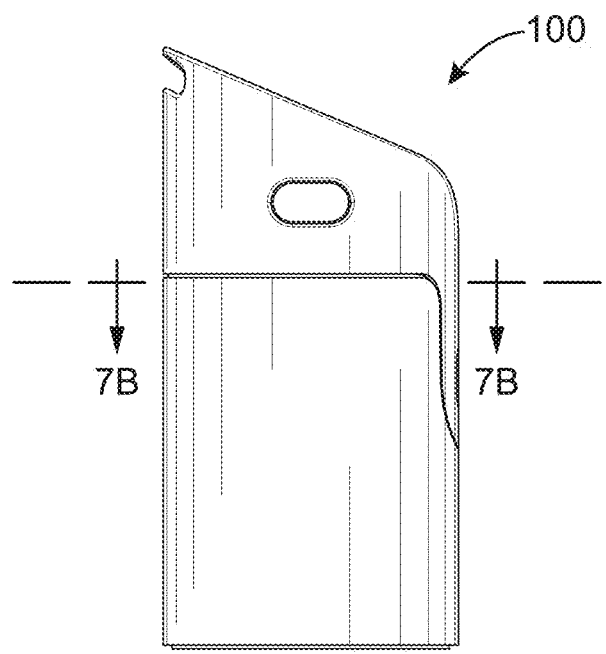
FIG. 7A is a side view of a vaporizing module according to one embodiment.

According to certain embodiments, the flow of gas introduced from the gas inlet 120 to the container 100 creates an at least partly circular flow of gas about the inner surface 114 of the container, in the horizontal direction. For example, referring to FIG. 7B which is a cross-sectional view of the device 100 as shown in FIG. 7A, the flow of gas from the gas inlet 120 may create an at least partly circular flow path C. According to certain embodiments, the angle of incidence α may be selected such that a more or less laminar flow of gas along the inner surface 114 of the container 110 can be obtained, with the gas flow passing smoothly and with little turbulence along the inner surface of the container sidewalls 112. For example, the angle of incidence may be small enough such that the horizontal component of the gas flow is almost parallel with the profile of the inner surface region of the container 110. The at least partly circular flow of gas within the container may, in certain embodiments, also impart an at least partly circular flow and/or rotation to vaporizable product in the chamber. According to yet a further embodiment, the gas inlet 120 is configured to introduce gas into the container 110 such that the gas flow within the container has primary horizontal component that is either in the clockwise or in the counter-clockwise direction (i.e. when viewed from above). That is, rather than introducing gas at an angle of incidence that causes the gas to ricochet and flow back in both clockwise and counter-clockwise directions (e.g. at a 90° or similar angle), the angle of incidence may be selected so that the gas flows smoothly in one primary direction about the inner surface of the container. According to one embodiment, the gas inlet 120 comprises a curved conduit 142 (not shown) to provide a flow of gas to the container 110. According to yet another embodiment, the gas inlet 120 comprises a conduit 142, at least a portion of which is angled in the horizontal direction from the first opening 120a to the second opening 120b, or the is otherwise angled and/or shaped to impart a horizontal component of flow to gas exiting the second opening 120b of the gas inlet 120. For example, according to certain embodiments, the gas inlet can comprise a conduit where at least that portion of the conduit leading to the second opening 120b has an angle in the horizontal direction with respect to the imaginary tangent line 130 that corresponds to the angle of incidence α described herein, to impart the horizontal angle of flow.

Figure 7B:
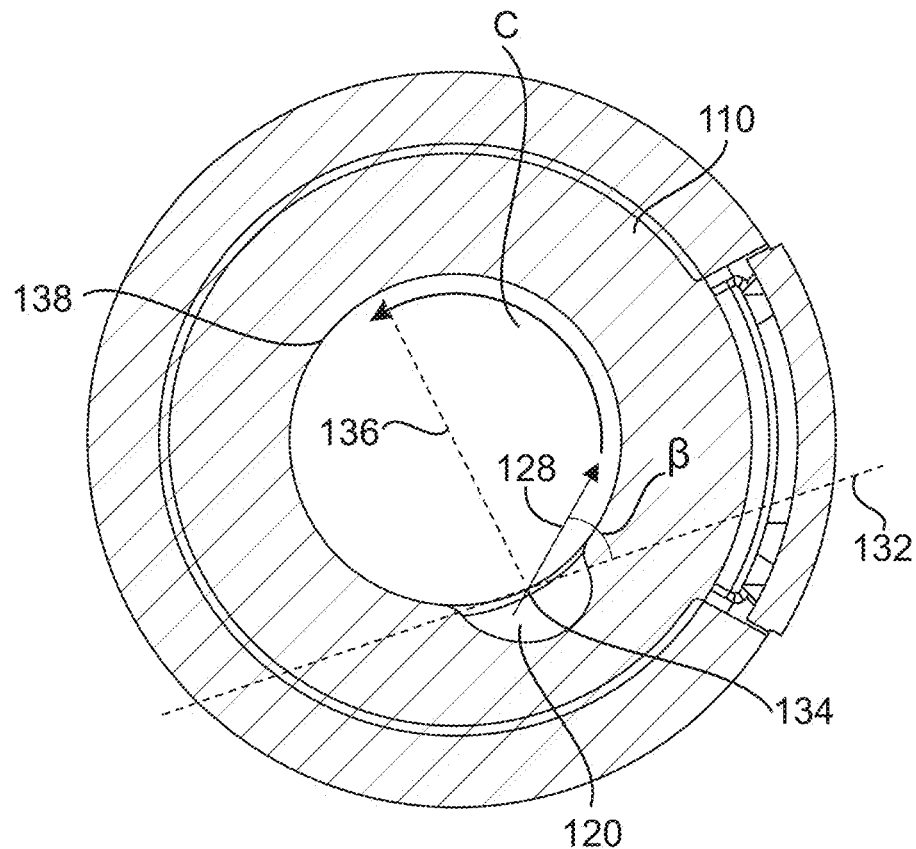
FIG. 7B is a cross-sectional top view of the vaporizing module of FIG. 7A, illustrating an angle of introduction.

According to yet a further embodiment, the horizontal component of the gas flow into the container 110 may be selected to have an angle of introduction β of the gas into the container that provides good vaporization results. Referring to FIG. 7B, the angle of introduction may be between a median of the horizontal component of flow (e.g. a primary flow component in the horizontal direction), that is directed towards the inner surface region 122, such as an inner surface region of the one or more sidewalls 112, and an imaginary tangent line 132 drawn through a point on the inner surface of the one or more container sidewalls 112 that is (i) in a horizontal plane at a point along the vertical height of the one or more container sidewalls 112, and that is (ii) at a location 134 along the circumference of the one or more sidewalls 112 that is closest to the second opening of the gas inlet. Similarly to the angle of incidence, the angle of introduction can be selected to provide enhanced gas flow and vaporization within the container 110. For example, in one embodiment, the angle of introduction β is significantly less than 90°, such as to avoid ricochet and turbulence that may be caused by direct impingement of the gas flow against a portion of the inner surface 114 directly opposing the gas inlet. For example, the angle of introduction β may be no more than 75°, no more than 70°, no more than 65°, no more than 60°, no more than 55°, and/or no more than 50°. According to certain embodiments, the angle of introduction β may be at least 3°, such as at least 5°, at least 8°, at least 10°, at least 15°, at least 20°, at least 25°, at least 30°, at least 40° and/or at least 45°. In certain embodiments, the angle of introduction β may be within a range of 10° to 75°, such as from 30° to 60°, from 45° to 55°, and/or from 48° to 50°. According to one embodiment, the gas inlet 120 can comprise a conduit where at least that portion of the conduit leading to the second opening 120b has an angle in the horizontal direction with respect to the imaginary tangent line 132 that corresponds to the angle of introduction β described herein, to impart the horizonal angle of flow.

According to yet another embodiment the horizontal component of the gas flow is selected such that it substantially is not directed against a surface of the container 110 that is directly opposing the gas inlet 120. For example, the median of the horizontal component of flow (e.g. a primary flow component in the horizontal direction) may be selected such that it has a horizontal angle in a range of from 40° to 95°, such as from 50° to 90° and/or from 60° to 80° with respect to an imaginary line 136 from the point 134 on the container closest to the second opening, to the point 138 on the container directly opposing the second opening of the gas inlet. Similarly, according to one embodiment, the gas inlet 120 can comprise a conduit where at least that portion of the conduit leading to the second opening 120*b* has a horizontal angle in a range of from 40° to 95°, such as from 50° to 90° and/or from 60° to 80° with respect to an imaginary line 136 from the point 134 on the container 110 closest to the second opening 120*b*, to the point 138 on the container 110 directly opposing the second opening 120*b* of the gas inlet 120.

According to certain embodiments, the device 100 comprises a limited number of gas inlets 120, to provide a proper flow of gas into the container 110. For example, according to certain aspects, the device can comprise from one to three gas inlets 120, such as from one to two gas inlets 129, and in certain embodiments preferably contains only a single gas inlet 120 to introduce gas into the container 110.

In operation, according to certain embodiments, the device 100 is configured such that container 110 can be accessed for refill or repair by removal of the mouthpiece 106. The removal of the mouthpiece can include completely separating the mouthpiece 106 from the rest of the device 100, or otherwise exposing the interior chamber 104 of the device by opening the mouthpiece and/or at least partly separating the mouthpiece from the device, such as in a case where the mouthpiece is opened and/or removed but remains tethered or otherwise attached to the device. That is, the container 110 and mouthpiece 106 may in certain embodiments be aligned coaxially with one another (see longitudinal axis A in FIG. 4B), such that removal and/or opening of the mouthpiece 106 from the device 100 to expose the interior of the device, such as the interior chamber 104, also exposes the container 110. Furthermore, according to certain embodiments, by aligning the container 110 and mouthpiece 106 such that they share a longitudinal axis A, gas having vaporized product entrained therein that leaves the container 110 can flow up to and out of the outlet of the mouthpiece 106 positioned directly over the container 110, to provide for a compact device form. In one embodiment, the mouthpiece 106 is arranged such that it is positioned directly over the container in the vertical direction, and in communication with the container via the upper interior chamber portion 104*a*. According to yet another embodiment, the mouthpiece 106 creates a seal about the interior chamber 104, such as at an interface between the mouthpiece 106 and the remainder of the device, so that the flow of gas can travel from the lower interior chamber portion 104*b* where the container 110 is disposed, to the upper interior chamber portion 104*a* where the inhalation outlet is located.

Figure 6A:
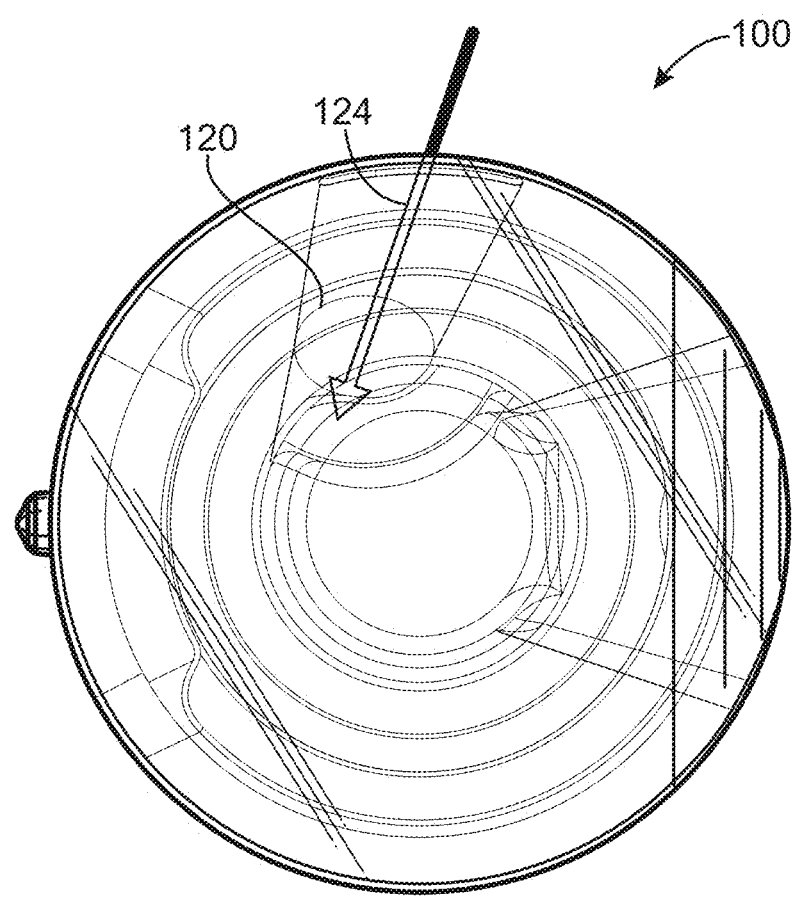
FIG. 6A is a schematic top view of an embodiment of an electronic vaporizing device, illustrating gas flow through a gas inlet, according to one embodiment.
Figure 6B:
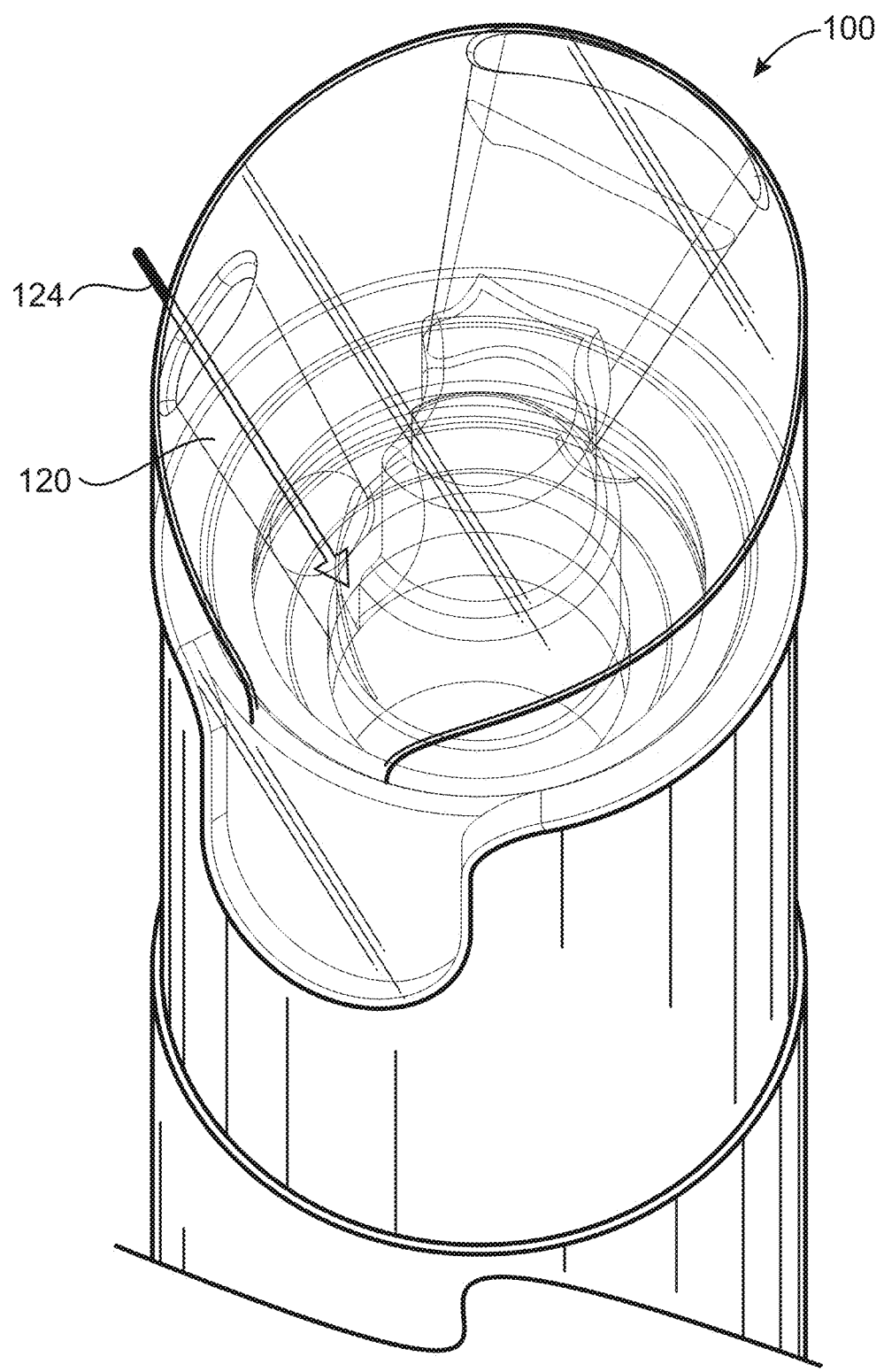
FIG. 6B is a schematic perspective rear view of the embodiment of an electronic vaporizing device of FIG. 6A, illustrating gas flow through the gas inlet.
Figure 6C:
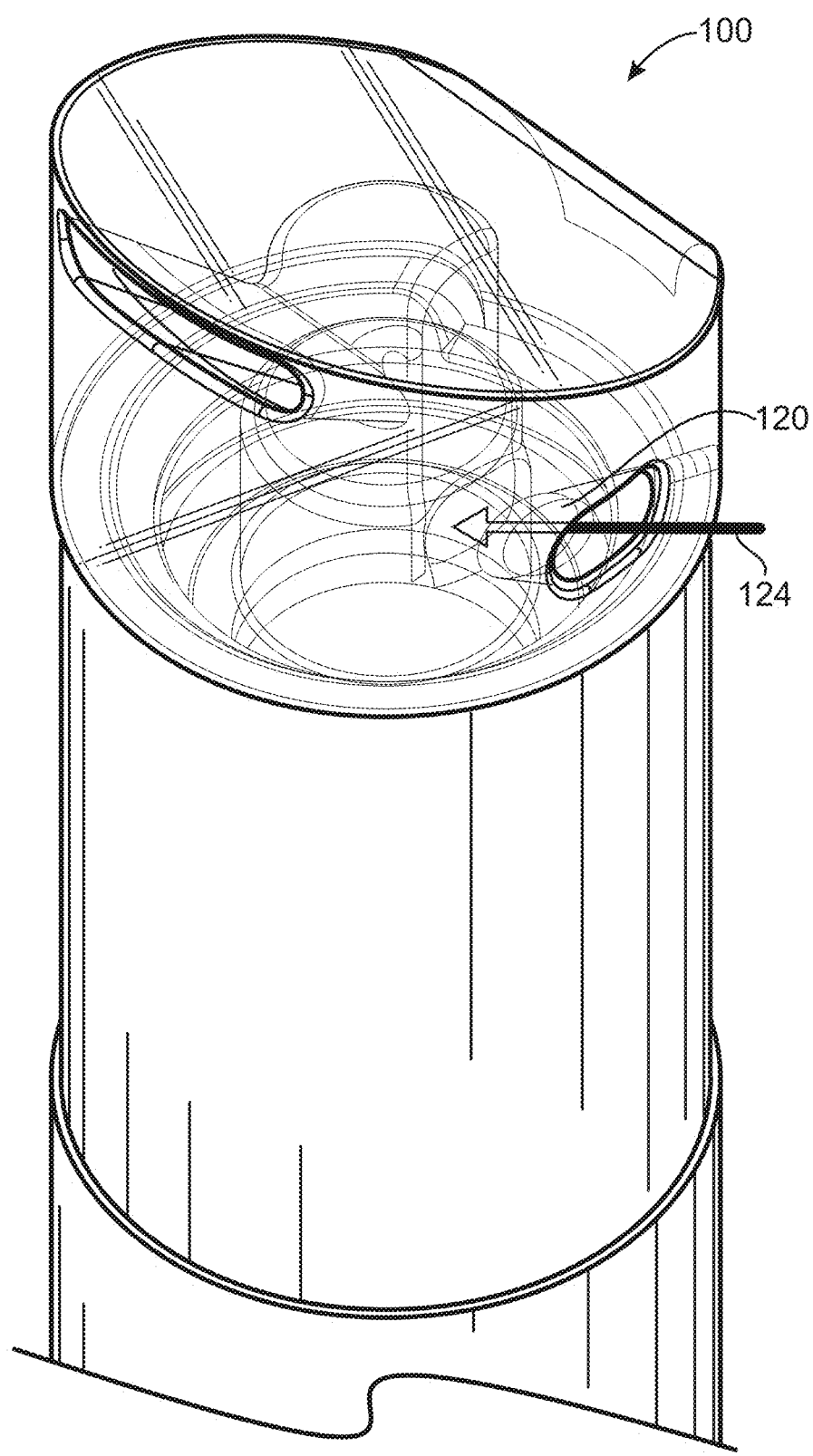
FIG. 6C is a schematic perspective front view of the embodiment of the electronic vaporizing device of FIG. 6A and FIG. 6B, illustrating gas flow through the gas inlet.
Figure 6D:
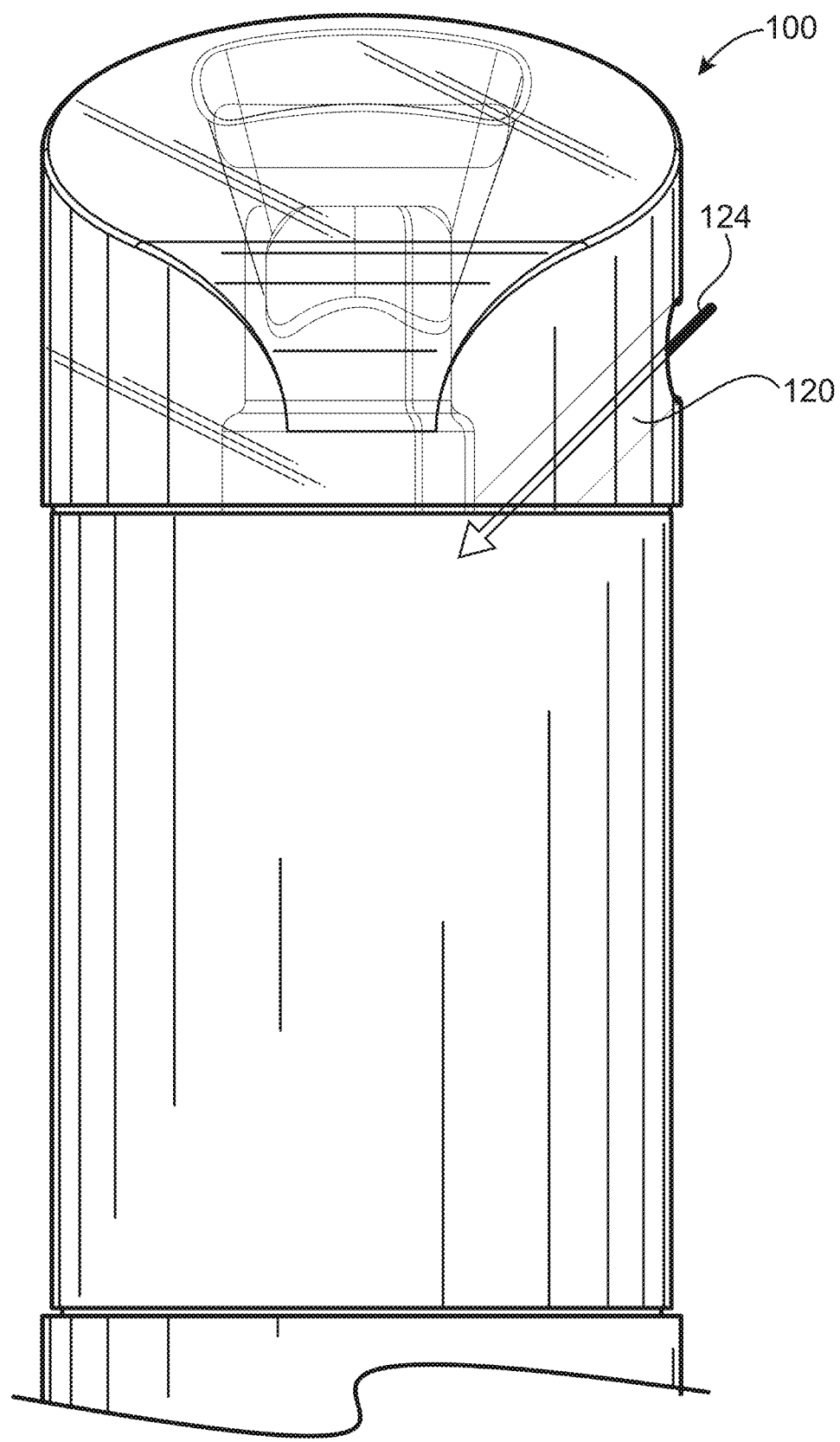
FIG. 6D is a schematic rear view of the embodiment of the electronic vaporizing device of FIGS. 6A, 6B and 6C, illustrating gas flow through the gas inlet.

Referring to FIG. 4A, according to certain embodiments, the gas inlet 120 comprises a first opening 120*a* that is configured to receive ambient gas from outside the device therein, and introduce the ambient gas into the device. According to one embodiment, the gas inlet 120 comprises a first opening 120*a* located on an external surface 144 of the device housing 102 to receive a flow of ambient gas into the gas inlet conduit 142. According to one embodiment, at least a portion of the gas inlet conduit 142 extends through the housing 102 from the first opening 120*a* to the second opening 120*b*. For example, the gas inlet conduit 142 may be through a sidewall of the housing 102. According to another embodiment, the gas inlet 10 comprises a conduit 142, at least a portion of which is angled horizontally and/or vertically, such as from the first opening 120*a* to the second opening 120*b*, or at least along a portion of the conduit 142 leading to the second opening. According to certain embodiments, all or a part of the conduit may be angled in a direction towards a sidewall of the housing 102 (e.g. as shown in FIGS. 6A-6B), to provide a flow of gas into the container that is directed towards an inner surface region 122 of the container. For example, at least a portion of the conduit may be horizontally angled such that it provides a flow of gas into the container 110 that is directed towards an inner surface region that is adjacent the second opening 120*b*. According to one embodiment, the gas inlet 120 comprises a nozzle (not shown) that extends into one or more of the upper interior chamber portion 104*a* and/or the container 110. According to one embodiment, the gas inlet 120 comprises a curved conduit 142 to provide a flow of gas to the container 110.

According to one embodiment, the first opening 120*a* is located in a region of the external surface of the housing that is vertically above the container (when the device is in the closed position, such as during operation of the device). For example, according to one embodiment, the housing 102 comprises an upper housing portion 102*a* defining the upper interior chamber portion 104*a*, and a lower housing portion 102*b* defining the lower interior chamber portion 104*b*, and wherein the first opening 120*a* of the gas inlet 120 is located in a region of an external surface in the upper housing portion 102A. According to certain aspects, the second opening 120*b* of the gas inlet 120 introduces gas into the upper interior chamber portion 104A at a location that is vertically above the container 110 (when the device is in the closed position, such as during operation of the device). For example, according to one embodiment, the gas inlet 120 may direct the flow of gas into the container 110 from a second opening 120*b* that is located vertically above the container 110, such as a second opening 120*b* that is at the end of a conduit 142 that terminates at a position vertically above the container 110. According to another embodiment, the second opening 120*b* can introduce gas into the lower interior chamber 104*b* at a location that is within the container 110, such as for example a second opening 120*b* at the end of a conduit 142 that at least partly extends into the container 110.

In certain embodiments of the device 100, the gas inlet 120 is located below the inhalation outlet 108 of the mouthpiece 106, as shown for example in FIGS. 3A-3B. According to certain aspects, the inhalation outlet 108 can comprise an aperture 109 formed in a region of an external surface of a sidewall 146 of the housing 102, or in an external surface of a top wall 147 of the housing 102, and the first opening 120*a* of the gas inlet 120 can be located vertically below the aperture 109 of the inhalation outlet 108. In one embodiment, at least a portion, or all, of the conduit 142 of the gas inlet 120 may be located vertically below the inhalation outlet 108 of the mouthpiece 106.

According to one embodiment, the aperture 109 of the inhalation outlet 108 is formed in a region of an external surface of the sidewall 146 of the housing 102 that is adjacent the top wall 147 of housing 102. For example, the aperture 109 of the inhalation outlet 108 can be formed in a region of an external surface of a sidewall 146 of the housing 102 that is located at an edge 149 of the housing 102 where the sidewall 146 of the housing 102 meets the top wall 147 of the housing 102. According to one embodiment, the inhalation outlet 108 can comprise an angled inhalation outlet conduit 111 extending from the aperture 109 to the upper interior chamber portion 104*a*. According to yet another embodiment, the second opening 120*b* of the gas inlet 120 is located vertically below the aperture 109 of the inhalation outlet 108, such as to release gas into a region of the upper interior chamber portion 104*a* that is vertically below the aperture 109 of the inhalation outlet 108.

Figure 8A:
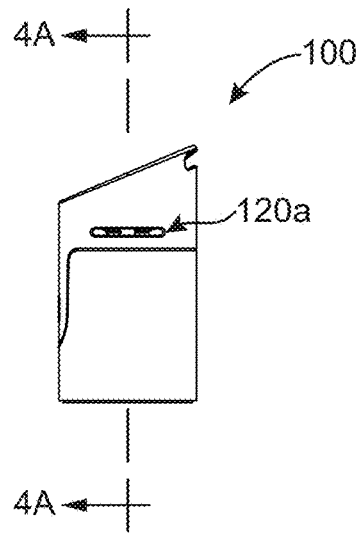
FIGS. 8A and 8B are side and front views, respectively, of an embodiment of a vaporizing module.
Figure 8B:
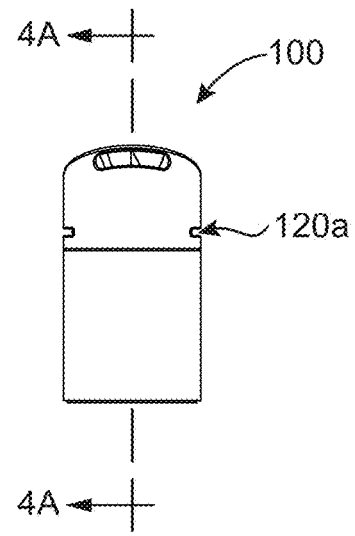
Figure 8C:
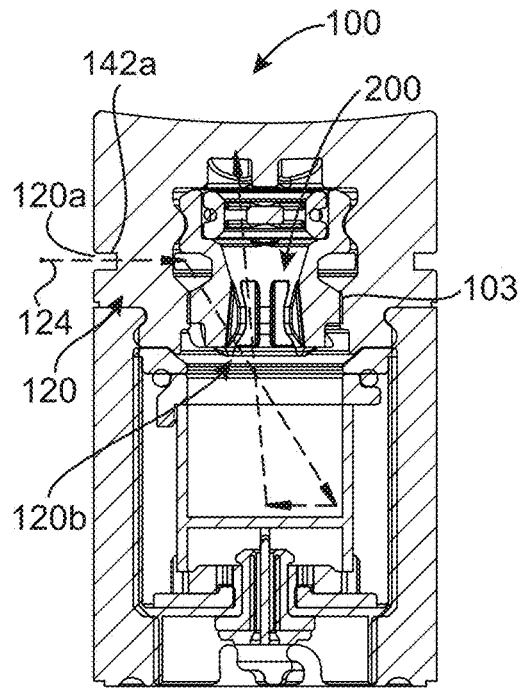
FIG. 8C is a cross-sectional front view.
Figure 8D:
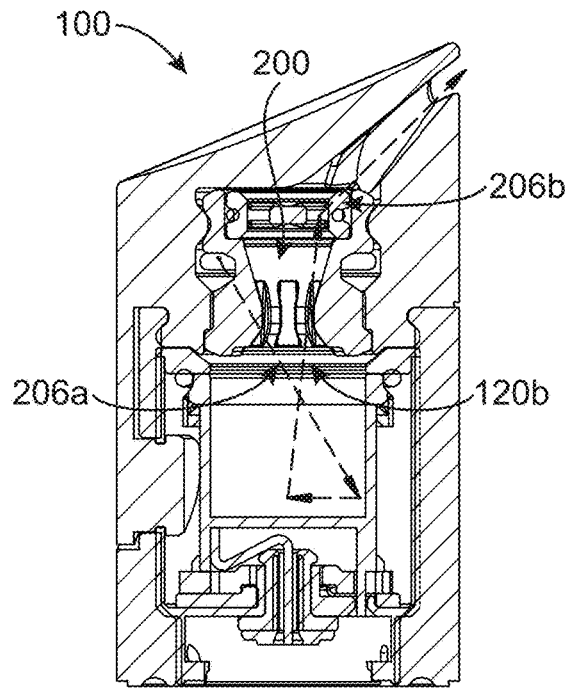
FIG. 8D is a cross-sectional side view, of the embodiment of the vaporization module of FIGS. 8A and 8B, having an insert.

According to one embodiment, as shown in FIGS. 8A-8D and 9A-9B the gas inlet 120 is at least partly formed in an insert 200 provided within the interior chamber 104, such as in the upper interior chamber portion 104*a*. The insert 200 can be is configured to receive ambient gas introduced into the device 100 via a first opening 120*a* located on an external surface of the device housing 102, and provide the flow of gas from the first opening 120*a* to the container 110 via a conduit 142 that extends from the first opening 120*a* to the second opening 120*b*, at least a portion of the conduit 142 being formed in and/or defined by the insert 200. According to one embodiment, a portion of the conduit 142 that is formed in and/or defined by the conduit receives a flow of gas from another portion of the conduit that extends through the housing of the device and connects to first opening located in an external surface of the housing, as shown in FIGS. 8C-8D. The second opening 120*b* of the gas inlet 120 may be located and/or defined by the insert 200, such as at a bottom surface 201 of the insert. As shown in FIG. 8C, a first portion 142*a* of the conduit can be formed in the housing of the device, and receives ambient gas from the first opening 120*a*, and a second portion 142*b* of the conduit provides a flow of gas through the insert 200 to the second opening 120*b* According to one embodiment, the insert 200 may be removably inserted into the upper chamber portion 104*a* of the interior chamber 104 of the device 100, such as for example to allow for removal of the insert 200 to access the container 110. According to another embodiment, the insert 200 can be affixed within the upper interior chamber portion 104*a* of the interior chamber 104 of the device 100, such as for example by adhering or mechanically attaching the insert to one or more interior surfaces 103 of the device housing 102. According to certain aspects, the insert 200 can be attached to interior surfaces 103 of a portion of the device housing 102 that also defines the mouthpiece 106, such that removal of the mouthpiece 106 also removes the insert 200 to allow access to the container 110.

According to one embodiment, the conduit 142 comprises a curved conduit having a component of curvature in a horizontal plane to provide the flow of gas into the container 110. According to certain embodiments, the insert comprises a conduit 142 having an at least partly spiral or curved flow path provided by one or more grooves 202 formed in a body 204 of the insert 200. The one or more grooves 202 may be entirely embedded in the body 204 of the insert 200, or may be defined at least in part by the housing of the device about the insert 200, such as in a case where the one or more grooves 202 are formed on an outer surface of the body 204 of the insert 200. According to one embodiment, the shape of the conduit 142 is angled and/or curved such that it provides a flow of gas into the container 110 that is directed towards an inner surface region of the container with a vertical and horizontal component of the gas flow as described above, and which may be selected to improve the vaporization of the product and/or reduce unwanted splashback. The arrows in FIGS. 8C and 8D depict embodiments of gas flow from the first opening 120*a* to the second opening 120*b* and into the container 110, where the gas flow is introduced into the container 110 from the gas second opening 120*b* with a vertical and horizontal component selected to direct the flow of gas towards the inner surface region 122 of the sidewall 112 of the container 110. That is, the flow of gas exiting the gas inlet 210 via second opening 120*b* may be directed with a downward component and also a horizonal component to provide the angle of incidence against the inner surface region 122 of the container 110 as described elsewhere herein.

As is also shown in FIGS. 8C and 8D, according to certain embodiments, the insert 200 may further comprise one or more gas flow openings 206*a* formed in the body 204 of the insert 200 that provide a gas flow path for gas having vaporized product entrained therein to exit the container 110 and transit through the insert 200 to a gas flow exit 206*b* that provide a flow of the gas entrained with vaporized product to the inhalation outlet 108. That is, the insert 200 may provide a flow path for gas having vaporized product entrained thereinto travel from the container 110 to the inhalation outlet 108, through the upper interior chamber portion 104*a* that is at least partly occupied by the insert 200. In one embodiment, the insert 200 comprise an insert conduit 206*c* connecting the gas flow opening 206*a* and gas flow exit 206*b*, that is formed through the body 204 of the insert 200. According to another embodiment, the insert 200 may have external groves or channels, or may be otherwise configured to allow a flow of gas having vaporized product therein to travel around the insert 200 from the container 110 to the inhalation outlet 108. In the embodiments as shown in FIGS. 8A-8D, the insert 200 is located in the upper interior chamber portion 104*a* above the container 110. In other embodiments, the insert 200 or a part thereof may at least partly extend into the container 110.

According to certain embodiments, the device 100 comprises a cap portion 148 comprising the mouthpiece 106 and a body portion 150. The body portion 150 can be configured to receive the container 110 therein. The cap portion 148 may further be releasably sealable to the body portion 150, to provide a closed configuration when the cap portion 148 is sealed to the body portion 150, and an open configuration when the cap portion is lifted off and/or otherwise unsealed or removed from the body portion 150. The device 100 may also comprise a base portion 151 below the cap portion 148 and body portion 150, such as a base portion 151 configured to receive the body portion 150, e.g., via threading or otherwise attaching the body portion 150 to the base portion 152. In certain embodiments, the base portion 151 may comprise a compartment 310 to house electronics for operation of the device 100, such as for example a CPU or controller that is capable of controlling a flow of power to the heating element 118, and other electrically powered systems, such as lights, as well as communication between the device and other electronics. The base portion 151 may also be configured to house a power supply, such as by including a compartment to house a battery to supply power to the device, or may include electrical connectors or other parts capable of connecting with external power supplies to provide power to the device. The housing 102 may include housing segments for both the cap portion 148 and the body portion 150, as well as for the base portion 151.

According to one embodiment, the portion of the housing 102 corresponding to the cap portion 148 defines the upper interior chamber portion 104*a* of the interior chamber 104, and the portion of the housing 102 corresponding to the body portion 150 defines the lower interior chamber portion 104*b* of the interior chamber 104. According to certain embodiments, as shown in FIGS. 3A and 3B, the cap portion comprises at least a part, or even all of the gas inlet 120, such as at least a portion, or all, of the conduit 142. According to a further embodiment, the inhalation outlet 108 and the gas inlet 120 are both located in the cap portion 148. In one embodiment, the first opening 120*a* of the gas inlet 120 is formed on an external surface 149 of the cap portion, and at least a portion of the conduit 142 connecting the first opening 120a to the second opening 120b extends through a section of the housing 102 corresponding to the cap portion 148. According to certain embodiments, the first opening 120a is formed in a first region of an external surface 149 of a sidewall 145 of the cap portion 148, and the inhalation outlet comprises an aperture formed in a second region of the external surface 149 of the sidewall 145 of the portion of the housing corresponding to the cap portion 148, or formed in an external surface 149 of a top wall 143 of the portion of the housing corresponding to the cap portion 148, and wherein the first opening 120a is located vertically below the aperture 109 of the inhalation outlet 108. According to one embodiment, the aperture 109 of the inhalation outlet 108 is formed in a region of an external surface of a sidewall of the portion of the housing corresponding to the cap portion 148 that is adjacent a top wall of the portion of the housing corresponding to the cap portion. According to one embodiment, the aperture 109 of the inhalation outlet 108 is formed in a region of the external surface of a sidewall of a portion of the housing corresponding to the cap portion 148 that is located at an edge of the portion of the housing corresponding to the cap portion 148 where the sidewall meets the top wall of the portion of the housing corresponding to the cap portion 148. According to another embodiment, the body portion 150 can comprise at least a portion of the gas inlet 120. For example, according to one embodiment, the first opening 120a of the gas inlet 120 can be formed in an external surface of a sidewall of a portion of the housing corresponding to the body portion 150. According to another embodiment, both the first opening 120a of the gas inlet 120, and the aperture 109 of the inhalation outlet 108, are located in the cap portion 148. In certain embodiments, the first opening 120a of the gas inlet 120 is configured to introduce a flow of ambient gas into the cap portion 148 from outside the cap portion 148. For example, the first opening 120a of the gas inlet 120 can be located on an external surface of a portion of the housing corresponding to the cap portion 148, and can introduce ambient gas from outside the cap portion 148 into the gas inlet conduit 142.

According to one embodiment, the first opening 120a can be located in a region of an external surface of a portion of the housing corresponding to the cap portion 148 that is vertically above the container 110 (e.g., when the cap is in the closed position with respect to the body portion, such as during operation as a part of a vaporizing device 150). According to one embodiment, a portion of the housing corresponding to the cap portion 148 defines the upper interior chamber portion 104a, and the gas inlet 120 can be configured to introduce gas into the upper interior chamber portion 104a at a location that is located vertically above the container 110 during operation of the device 100 (e.g., during operation of the device, when the cap is in the closer position with respect to the body portion 150). According to another embodiment, the cap portion 148 comprises a gas inlet 120 that is configured to direct the flow of gas into the container 110 from a second opening 120b that is located vertically above the container 110 during operation of the device. According to yet another embodiment, the second opening 120b of the gas inlet 120 introduces gas into the body portion 150 at a location that is within the container 110. According to another embodiment, the gas inlet conduit 142 is angled downwardly from the first opening 120a to the second opening 120b, as described herein.

Figure 3A:
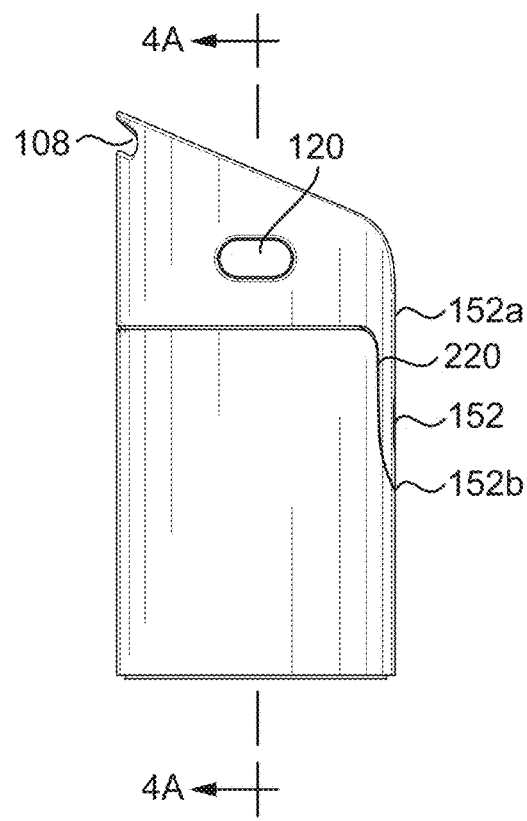
FIG. 3A is a side view of an embodiment of a vaporizing module.
Figure 3B:
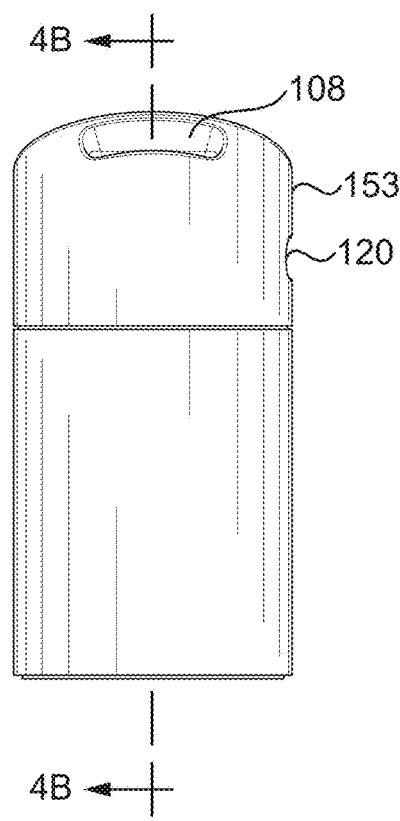
FIG. 3B is a front view of the embodiment of the vaporizing module of FIG. 3A.

In certain embodiments, the cap portion 148 is attached to the body portion 150 by a flexible tether 152, having a first end 152a that extends from the cap portion or body portion, and a second end 154 that is attached to the other of the cap portion or the body portion (see FIG. 3A). In one embodiment, the first end 152a is unitary with at least a part of either the cap portion 148 or body portion 150, and the second end 152b is adhered to the other of the cap portion 148 or body portion 150. According to yet another embodiment, at least one of the cap or the body portion comprises a snap connection 154 to releasably seal the cap portion to the body portion, the snap connection 154 comprising an at least partly annular/circumferential rim or rib 154a on a cap portion housing or a body portion housing that is complementary to and capable of engaging with an at least partly annular/circumferential recess 154b on the other of the cap portion housing or the body portion housing. In yet further embodiments, the cap portion 148 may be releasable from the body portion 150 by pulling the cap and body portions apart from one another (e.g., pulling the cap upwardly) at a side of the device that is opposite to a side where the cap and body portions are tethered together, and bending the tether portion to rotate the cap portion away from the body portion, for example by using the tether similarly to a hinge. The tether 152 may be arranged with respect to the inhalation outlet 108 such that the inhalation outlet 108 is not obstructed or blocked by tethering of the cap portion 148 to the body portion 150. In certain embodiments, the tether 152 is connected to the cap portion 148 on a side of the cap portion that is opposite a side where the inhalation outlet 108 and/or aperture 109 is located, or is otherwise connected to the cap portion at a region other than where the inhalation outlet 108 and/or aperture 109 is located.

According to one embodiment, the width of the annular rim of the snap connection 154 is thinner on the side of the device where the cap and body portions are tethered together, and is thicker on the opposite side of the device where the cap portion and body portion can be pulled apart from one another. Referring to FIG. 1A, according to one embodiment, a width of the annular rim 154a of the snap connection 154 is cut away on the side of the device where the cap and body portions are tethered together.

According to one embodiment, the upper interior chamber portion 104a and the lower chamber interior portion 104b of the interior chamber 104 are substantially continuous with one another, such that the flow of gas can pass substantially unimpeded downwardly from the second opening 120b of the gas inlet 120 and through the upper portion 104a of the interior chamber to the container 110 in the lower portion 104b of interior chamber, and the flow of gas entrained with vaporized product can pass substantially unimpeded from the container 110 in the lower interior chamber portion 104b through the upper interior chamber portion 104a and out of the inhalation outlet 108 in the mouthpiece 106. According to one embodiment, the gas inlet 120 is configured to direct the flow of gas into the interior chamber 104 and to the container 110, and the flow of gas entrained with vaporized product that flows out of the container 110 and through the interior chamber 104 towards the inhalation outlet 108, where the flow of gas into the container 110 and the flow of gas towards the inhalation outlet 108 pass through a same volume of the interior chamber 104. That is, the gas inlet may introduce gas into a volume of the upper interior chamber portion 104a, which gas is directed towards the container in the lower interior chamber portion 104b, and the gas that has vaporized product entrained therein that flows out of the container 110 also passes through the same volume of the upper interior chamber portion 104a as it flows towards the inhalation outlet 108.

According to one embodiment, the inhalation outlet 108 is located vertically above the gas inlet 120. For example, the inhalation outlet 108 can be located towards a top of the device housing 102. According to yet another embodiment, the inhalation outlet 108, such as for example the aperture 109 of the inhalation outlet 108, is located at about a same vertical level or below the first opening 120*a* of the gas inlet 120. According to another embodiment, the aperture 109 of the inhalation outlet 108 may be located vertically above the conduit 142 and/or second opening 120*b* of the gas inlet 120, or the aperture 109 of the inhalation outlet 108 may be located at about a same vertical level or below at least a portion of the conduit 142 of the gas inlet 120 and/or second gas opening 120*b*.

In the embodiment as shown in FIGS. 1A-1B and 4B, the aperture 109 of the inhalation outlet 108 is located at a top corner of the housing 102, in the cap portion 148 of the device 100. The inhalation outlet 108 may also comprise a conduit that is at least partly angled upwardly to provide a flow path that is convenient for inhalation by a user. In the embodiments as shown, the device 100 comprises only a single gas inlet 120 to introduce the flow of gas into the interior chamber 104. However, it may also be possible to include a plurality of gas inlets 120 at different locations on the device, to provide for a flow of gas to the container 110. According to one embodiment, the mouthpiece 106 and gas inlet 120 are both at least partly defined by a part of the housing about the upper interior chamber portion 104*a*, such as a housing section for the cap portion 148.

According to certain other embodiments, the heating element 118 can comprise any of a heating plate, a heating rod, a heating coil, at least partly embedded heater traces, or other heating structure capable of heating the container, and may include any of a resistive heater, an inductive heater, a radiative heater, and the like. In certain embodiments, the heating element 118 comprises heater traces embedded in the container 110. For example, the container 110 may comprise heater traces that extend at least partly and even entirely circumferentially about the container, and at least partly vertically up the one or more sidewalls 112 of the container 110, as shown for example in FIG. 4A. In one embodiment, the embedded heater traces extend vertically to at most 80%, 75%, 70%, 60%, 65%, 55%, 50%, 45%, 40%, 35% and/or 30% of the height of the one or more sidewalls of the container. As another example, the embedded heater traces extend vertically to at most half of the height of the one or more sidewalls 112 of the container 110, so as to provide heating of a bottom portion of the container 110. According to yet another example, the bottom wall 116 of the container 110 may be absent any heater traces embedded therein, and also absent any other heating element that could provide direct heating to the bottom wall. In one embodiment, the heater traces are embedded in one or more sidewalls 112 of the container 110, and are resistively heated by flowing a current through the traces, which conductively heats the container sidewalls 112 about the heater traces, providing a container with heated sidewalls capable of heating a vaporizable product provided in the container. An example of a suitable heating element corresponding to heating traces embedded in a container is described, for example, in U.S. Pat. No. 11,659,865, issued on May 30, 2023, which is hereby incorporated by reference herein in its entirety. According to one embodiment, the heating element 118 is configured to be electrically connected to a battery, such as a battery housed in the base portion 151, as described above. In other embodiments, the heating element 118 can be configured to be connected to an external power source.

According to one embodiment, the surface region 122 located on one or more sidewalls 112 of the container 110, to which the gas inlet 120 is configured to direct the flow of gas, is located in a vertical range that is above or at about a same level as the highest point of the embedded heater traces.

Figure 10:
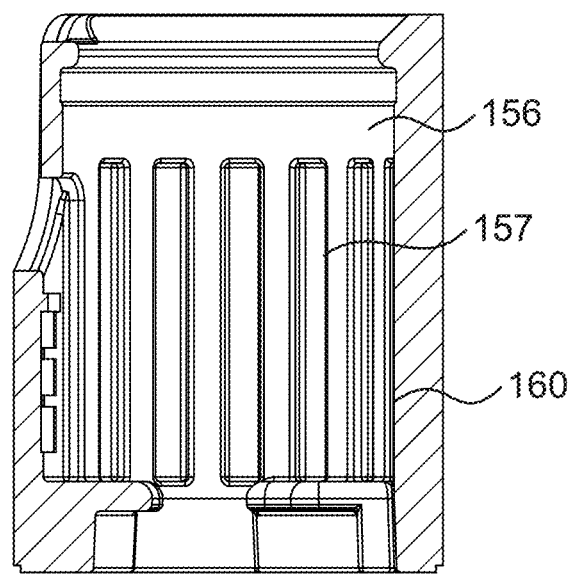
FIG. 10 is a sectional view of an embodiment of an insulating sleeve for an electronic vaporizing device.

According to certain embodiments, the device 100 further comprises an insulating sleeve 156 disposed about the periphery of the container 110 and between an external surface 158 of the container 110 and an internal surface 160 of the housing 102, the insulating sleeve 156 comprising one or more corrugated surfaces, as shown for example in FIGS. 4A and 10. According to certain embodiments, the insulating sleeve 156 can occupy at least a portion, such as a major portion and even substantially all of a volume of the lower interior chamber portion 104*b* that is located between the external surface of one or more sidewalls 112 of the container 110, the internal surface of one or more sidewalls of the housing 102, to provide a thermally insulating effect. For example, according to certain embodiments, the insulating sleeve 156 can thermally the walls of the housing 102 from the container 110, such that vaporizable product in the container 110 can be heated to an appropriate temperature, without excessively increasing the temperature of the device housing 102, which could reduce the heating efficiency of the device and could be unpleasant to a device user.

Another aspect of the invention as described herein is directed to a method of using the electronic vaporizing device as described herein, comprising, according to one embodiment, providing vaporizable product to the container in interior chamber, activating the heating element to heat the vaporizable product in the container to at least partly vaporize the product, such as by supplying electrical power to the heating element, and inhaling gas having the vaporizable product entrained therein from the inhalation outlet of the mouthpiece. According to one embodiment, a method of using the portable electronic vaporizing device is performed in the absence of any movable physical structure in the container that would be capable of mechanically imparting kinetic energy to the vaporizable product in the container. For example, the method can be performed without the use of beads, pearls, balls, stirrers, or other mechanical objects in the container that would be capable of mechanically imparting kinetic energy to the vaporizable product in the container. According to another embodiment, the method is performed to direct the flow of gas from the gas inlet to the container substantially without ejecting vaporizable product in liquid form from the container into the upper interior chamber portion when it is contacted by the gas flow.

According to yet another embodiment, the device comprises a vaporizing module 162 that comprises the housing 102 defining the interior chamber 104 having the upper interior chamber portion 104*a* and the lower interior chamber portion 104*b*, the mouthpiece 106, the container 110, the heating element 118, and the gas inlet 120, as described according to any of the embodiments. According to certain embodiments, the vaporizing module 163 and base portion 151 are configured to be removably attached to one another, such as via a threaded or screw-type connection, or a snap connection, or other removably attachable connection. According to certain embodiments, the base portion 151 houses one or more components for electrically connecting to a power source (internal or external) for supplying power to the heating element 118 in the vaporizing module. For example, the base portion 151 can comprise a compartment 310 for a battery that serves as a power source for the heating element, and can further include wires to electrically connect the battery to the vaporizing module to supply power to the heating element 118. As another example, the compartment 310 of the base portion can also house electrical components such as wiring, or a connector to an electrical cord for electrically connecting to an external power source, such as via an electrical outlet. Other electrical components such as user controls and a user interface can also be provided as a part of the base portion.

In certain embodiments, the vaporizing module 162 is configured to provide an open state where an upper housing portion 102a that at least partly defines the upper interior chamber is removed from a lower housing portion 102b that at least partly defines the lower interior chamber, to provide access to the container, and a closed state where the upper housing portion is sealed to the lower housing portion. For example, in a case where the mouthpiece 106 corresponds to and/or is defined by the upper housing portion 102a the mouthpiece 106 can be lifted or otherwise removed from a portion 400 of the module (e.g., the lower housing portion 102b) that houses the container 110, to provide access to the container 110, in an open state (e.g. as in FIG. 1A), and a closed state (e.g. as in FIG. 1B) where the mouthpiece 106 can be sealed to the portion 400 of the module housing the container 110, such as a portion corresponding to the lower housing portion 102b. For example, in certain embodiments, the mouthpiece may be at least partly defined by the upper housing portion 102a, and the container may be disposed within the lower housing portion 102b that defines the lower interior chamber portion 104b, and the upper housing portion may be releasably sealed to the lower housing portion in a closed state of the vaporizing module, and the upper housing portion can be lifted off or otherwise removed and/or unsealed from the lower housing portion in the open state. As another example, in certain embodiments, the mouthpiece may be located in a cap portion of 148 of the vaporizing module, and the container may be disposed within a body portion 150, and the cap portion may be releasably sealed to the body portion in a closed state of the vaporizing module, and the cap portion can be lifted off or otherwise removed and/or unsealed from the body portion in the open state. As another example, the cap portion can comprise a portion of the upper interior chamber, and the body portion can comprise a portion of the lower interior chamber, and the cap portion may be releasably sealed to the body portion in a closed state of the vaporizing module, and the cap portion can be lifted off or otherwise removed and/or unsealed from the body portion in the open state. According to certain embodiments, the container cannot be accessed from above the container, when the vaporizing module is in the closed state. The mouthpiece 106 can be sealed to the portion 400 of the module by any releasable sealable connection, such as without limitation via a snap connection, or a threading or screw-type connection. For example, the mouthpiece 106 can be sealed to the portion 400 of the module to provide a closed flow of gas from the container to the mouthpiece during operation of the device. As another example, the mouthpiece 106 can be sealed to the portion 400 of the module to cover the container 110 when the device is not in use, for example to inhibit any leaking of vaporizable product from the container, or to otherwise protect the container and keep it free of contaminants.

According to one embodiment, the vaporizing module 163 can be removed from the base portion 151 while the vaporizing module is in the closed state. For example, the vaporizing module can be removed while the mouthpiece remains sealed to the portion 400 of the module housing the container (or the upper portion of the housing remains sealed to the lower portion, or the cap portion remains sealed to the body portion), such as by unscrewing or unsnapping the vaporizing module 163 and base portion 151 from each other while the mouthpiece remains sealed to the portion 400 of the module. According to certain aspects, by allowing the vaporizing module to be removed from the base portion while in the closed state, both the mouthpiece and container can conveniently be simultaneously removed from the base portion, such as for example to allow for swapping in of a fresh vaporizing module to connect to the base portion, and the container and any contents thereof can be protected by the sealed mouthpiece. According to one embodiment, the mouthpiece and the portion 400 of the module housing the container can remain physically connected to each other even in the open state, such by a tether 152 that has sufficient slack to allow the mouthpiece to be lifted off and/or removed from the portion 400 of the module housing in the open state, while keeping the mouthpiece tethered to the portion 400.

According to one embodiment, a vaporizing module 162 is provided that comprises the body portion 150 and cap portion 148 described above that are tethered to one another. For example, the vaporizing module 162 can comprise the mouthpiece 106 having the inhalation outlet 108, the cap portion having the mouthpiece, and the body portion 160. The vaporizing module 162 can be configured such that (i) the cap portion is releasably sealable to the body portion via an attachment feature 164, and (ii) the cap portion 148 is connected to the body portion 150 by the tether 152. The vaporizing module 162 further comprises the container 110 configured to receive the vaporizable product within the body portion of the housing, the heating element 118 configured to be electrically connected to the power source to heat the product in the container 110 and form vapor therefrom, and the gas inlet 120 configured to introduce a flow of gas into the container 110. According to certain embodiments, the gas inlet 120 comprises the first opening 120a, the second opening 120b, and the gas inlet conduit 142 connecting the first opening 120a to the second opening 120b, with the first opening 120a of the gas inlet 120 being located vertically above the container 110 when the cap portion 148 is sealed to the body portion 150, and wherein the gas inlet 120 is configured to introduce a flow of gas into the container 110 of the vaporizing device 100. According to embodiments herein, the gas inlet 120 can be configured to provide a downwardly angled flow of gas to an inner surface region 122 of the container 110, and with the horizontal component of flow, as is described according to any of the embodiments herein.

According to certain embodiments, the attachment feature 164 can comprise the snap connection 154 described above. According to certain embodiments, the cap portion 148 is configured to remain tethered to the body portion 150 upon removal of the cap portion from the body portion, and removal of the cap portion from the body portion provides access to the container 110, such as for example for filling or refilling the container with vaporizable product. In certain embodiments, the mouthpiece 106 acts as a cap or lid for the container 110.

According to one embodiment, the body portion 150 has a cutout 220 (see FIG. FIG. 3A) to accommodate the tether 152, and the tether is substantially flush with the body portion 150 when the cap portion 148 and body portion 150 are in the closed position. In one embodiment, the cutout 220 extends at least partly along a height of the body portion, and to an interface 222 of the body portion with the cap portion, to accommodate the tether 152 in a substantially flush configuration against a side of the body portion.

In yet another embodiment, the tether 152 connects to the insulating sleeve 156 that has corrugated ribs on an interior surface 157 thereof. According to yet further embodiments, the tether 152 is silicone, and is unitary with an insulating sleeve 156 comprising silicone that extends forms at least a portion of the housing for the body portion 150 or the cap portion 148. In one embodiment, the tether 152 is unitary with a silicone insulating sleeve that forms at least a portion of the housing for the cap portion, and the tether is adhered to a silicone insulating sleeve 156 that forms at least a portion of the housing for the body portion.

According to one embodiment, the vaporizing module 162 is configured to attach to the base portion 151 to together form a part of a larger vaporizing device 100, the base portion 151 having a compartment for a battery.

According to one embodiment, a section of the upper interior chamber portion above the container has an open volume with a width or diameter D1 as measured in a first horizontal plane that is at least 6 mm, at least 6.25 mm, at least 6.5 mm, at least 6.75 mm, at least 7 mm, at least 7.25 mm, at least 7.5 mm, at least 7.75 mm, at least 8 mm, at least 8.25 mm, at least 8.5 mm, at least 8.75 mm, at least 9 mm, at least 9.25 mm, at least 9.5 mm, at least 9.75 mm, at least 10 mm, at least 10.25 mm, at least 10.5 mm, at least 10.75 mm, at least 11 mm, at least 11.25 mm, at least 11.5 mm, at least 11.75 mm, and/or at least 12 mm, and no more than 15 mm, no more than 14 mm, no more than 13 mm, no more than 12 mm, no more than 11 mm, no more than 10 mm, and/or no more than 9 mm. According to yet another embodiment, the container has a width or diameter D2 as measured in a second horizontal plane that is vertically below the first horizontal plane, and wherein a ratio of D1:D2 is at least 0.5, at least 0.6, at least 0.7, at least 0.8, at least 0.9, at least 0.95, and/or at least 1, and no more than 3, no more than 2, and/or no more than 1. According to yet another embodiment, the first horizontal plane D1 is one or more of (i) directly above a top of the container, or (ii) less than 1 mm, less than 0.5 mm, less than 0.25 mm, less than less than 0.1 mm, less than 0.05 mm vertically above D2.

According to one embodiment, the inhalation outlet comprises a first aperture formed in an external surface of the mouthpiece, through which gas having the vaporizable product entrained therein flows out of the device, and wherein the first aperture is offset from a longitudinal axis of the container. According to another embodiment, the inhalation outlet comprises a first aperture formed in a region of an external surface of a sidewall of a portion of the housing corresponding to the mouthpiece. In yet another embodiment, the inhalation outlet comprises a first aperture formed in a region of an external surface of a sidewall of the housing that is adjacent a top wall of the housing. In yet another embodiment, the inhalation outlet comprises a first aperture formed in a region of an external surface of a sidewall of the housing that located at an edge where the sidewall meets a top wall of the housing.

According to one embodiment, the inhalation outlet comprises a first aperture 109 to flow gas out of the device, a second aperture 113 in communication with the upper interior chamber portion to receive the flow of gas having vaporized product entrained therein that flows from the container into the upper interior chamber portion, and a conduit connecting the second aperture to the first aperture, wherein at least a part of the conduit is angled away from the longitudinal axis from the second aperture to the first aperture. According to certain embodiments, the inhalation outlet is configured to re-direct the flow of gas having vaporized product entrained therein that flows from the container into the upper interior chamber portion, in a direction away from the longitudinal axis. In yet another embodiment, the inhalation outlet is configured to re-direct the flow of the gas in the direction away from the longitudinal axis by flowing the gas through a conduit that is angled away from the longitudinal axis, or by flowing the gas towards a baffle (not shown) that re-directs the flow.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

The following Enumerated Embodiments are provided for purposes of illustrating embodiments of the disclosure, and the invention is not limited thereto.

ENUMERATED EMBODIMENTS

Embodiment 1. An electronic vaporizing device comprising:
  a vaporizing module comprising:
    a housing defining an interior chamber having an upper interior chamber portion and a lower interior chamber portion;
    a mouthpiece having an inhalation outlet in communication with the upper interior chamber portion;
    a container configured to receive a vaporizable product within the lower interior chamber portion of the interior chamber, the container having one or more container sidewalls and a bottom wall, and the container having a longitudinal axis extending along a vertical direction of the electronic vaporizing device, and a horizontal axis that is perpendicular to the longitudinal axis;
    a heating element configured to be electrically connected to a power source to heat the product and form a vapor therefrom; and
    a gas inlet configured to introduce a flow of gas into the container, the gas inlet comprising a first opening, a second opening, and a gas inlet conduit connecting the first opening to the second opening,
    wherein the gas inlet is configured to direct the flow of gas (i) downwardly with a vertical angle of at least 20° with respect to the horizontal axis, and towards an inner surface region of the container, and (ii) with a horizontal component of the flow having an angle of incidence that is within a range of from 5 to 60 degrees,
    wherein the angle of incidence corresponds to the angle between the median of the horizontal component of the flow directed towards the inner surface region, with respect to an imaginary tangent line drawn through a point that intersects with the inner surface region, as measured in a horizontal plane taken at a vertical height of the container that contains the point of intersection,
    wherein in an open state, an upper housing portion that at least partly defines the upper interior chamber portion is removed from a lower housing portion that at least partly defines the lower interior chamber portion, to provide access to the container, and in a closed state the upper housing portion is sealed to the lower housing portion, and a base portion that is removably attachable to the vaporizing module, the base portion housing one or more components for electrically connecting to the power source to supply power to the heating element, wherein the vaporizing module can be removed from the base portion while the vaporizing module is in the closed state, and wherein in operation of the electronic vaporizing device, vaporizable product received in the container is heated by the heating element, becomes entrained in the flow of gas directed by the gas inlet into the container, and the flow of gas having the vaporized product entrained therein flows out of the container and through the upper portion interior chamber portion to flow out of the inhalation outlet of the mouthpiece.

Embodiment 2. The device according to Embodiment 1, wherein the inner surface region is on one or more sidewalls of the container.

Embodiment 3. The device according to any preceding Embodiment, wherein the gas inlet is configured to direct the flow of gas downwardly towards an inner surface region of the one or more sidewalls of the container that is between 1 mm to 10 mm above the bottom wall of the container.

Embodiment 4. The device according to any preceding Embodiment, wherein the device is configured to generate vapor from the vaporizable product without the presence in the container of any movable physical structure capable of mechanically imparting kinetic energy to the vaporizable product in the container.

Embodiment 5. The device according to any preceding Embodiment, wherein the device is configured to generate vapor from the vaporizable product by directing the flow of gas from the gas inlet to the container substantially without ejecting vaporizable product in liquid form from the container into the upper interior chamber portion when it is contacted by the gas flow.

Embodiment 6. The device according to any preceding Embodiment, wherein the first opening of the gas inlet is configured to introduce a flow of ambient gas into the device from outside the device.

Embodiment 7. The device according to any preceding Embodiment, wherein the first opening of the gas inlet is located on an external surface of the housing of the device, and introduces ambient gas from outside the device into the gas inlet conduit.

Embodiment 8. The device according to any preceding Embodiment, wherein at least a portion of the gas inlet conduit extends through the housing from the first opening to the second opening.

Embodiment 9. The device according to any preceding Embodiment, wherein the first opening is located in a region of an external surface of the housing that is above the container.

Embodiment 10. The device according to any preceding Embodiment, wherein the housing comprises an upper housing portion defining the upper interior chamber portion, and a lower housing portion defining the lower interior chamber portion, and wherein the first opening of the gas inlet is located in a region of an external surface in the upper housing portion.

Embodiment 11. The device according to any preceding Embodiment, wherein the second opening introduces gas into the upper interior chamber portion at a location that is above the container.

Embodiment 12. The device according to any preceding Embodiment, wherein the gas inlet directs the flow of gas into the container from a second opening located above the container.

Embodiment 13. The device according to any preceding Embodiment, wherein the second opening introduces gas into the lower interior chamber at a location that is within the container.

Embodiment 14. The device according to any preceding Embodiment, wherein the gas inlet conduit is angled downwardly from the first opening to the second opening.

Embodiment 15. The device according to any preceding Embodiment, wherein the gas inlet is configured to direct the flow of gas downwardly with a vertical angle with respect to the horizontal axis of at least at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62.

Embodiment 16. The device according to any preceding Embodiment, wherein the gas inlet is configured to direct the flow of gas downwardly with a vertical angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

Embodiment 17. The device according to any preceding Embodiment, wherein the conduit comprises a downward angle with respect to the horizontal axis that is at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62°.

Embodiment 18. The device according to any preceding Embodiment, wherein the conduit comprises a downward angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

Embodiment 19. The device according to any preceding Embodiment, wherein the flow of gas directed by the gas inlet into the container has a median flow with a downward angle with respect to the horizontal axis that is at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62°.

Embodiment 20. The device according to any preceding Embodiment, wherein the flow of gas directed by the gas inlet into the container has a median flow with a downward angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

Embodiment 21. The device according to any preceding Embodiment, wherein the downward angle of the flow of gas is imparted by a downward angle of the conduit.

Embodiment 22. The device according to any preceding Embodiment, wherein the downward angle of the flow of gas is imparted by a directing structure that is adjacent the second opening and that directs the flow of gas exiting the second opening downwardly into the container.

Embodiment 23. The device according to any preceding Embodiment, wherein the device comprises from one to three gas inlets, from one to two gas inlets, or a single gas inlet.

Embodiment 24. The device according to any preceding Embodiment, wherein gas inlet conduit has a height measured in a vertical direction parallel to the longitudinal axis, from the first opening to the second opening, at is at least 4 mm, at least 4.5 mm, at least 5 mm at least 5.5 mm, at least 6 mm, at least 6.5 mm, at least 7 mm, at least 7.5 mm, and/or at least 8 mm, and less than 10 mm, less than 9.5 mm, less than 9 mm, less than 8.5 mm, less than 8 mm, less than 7.5 mm, less than 7 mm, less than 6.5 mm, less than 6 mm, less than 5.5 mm and/or less than 5 mm.

Embodiment 25. The device according to any preceding Embodiment, wherein the gas inlet comprises a gas path length from the first opening to the second opening of at least 4 mm, at least 4.5 mm, at least 5 mm at least 5.5 mm, at least 6 mm, at least 6.5 mm, at least 7 mm, at least 7.5 mm, and/or at least 8 mm, and less than 10 mm, less than 9.5 mm, less than 9 mm, less than 8.5 mm, less than 8 mm, less than 7.5 mm, less than 7 mm, less than 6.5 mm, less than 6 mm, less than 5.5 mm and/or less than 5 mm.

Embodiment 26. The device according to any preceding Embodiment, wherein the inhalation outlet comprises an aperture formed in a region of an external surface of a sidewall of the housing, or in an external surface of a top wall of the housing, and wherein the first opening of the gas inlet is formed in another region of an external surface of the sidewall of the housing that is located vertically below the aperture of the inhalation outlet.

Embodiment 27. The device according to any preceding Embodiment, wherein the second opening of the gas inlet is located vertically below the aperture of the inhalation outlet.

Embodiment 28. The device according to any preceding Embodiment, wherein the second opening of the gas inlet releases gas into a region of the upper interior chamber portion that is vertically below the aperture of the inhalation outlet.

Embodiment 29. The device according to any preceding Embodiment, wherein the aperture of the inhalation outlet is formed in a region of an external surface of the sidewall of the housing that is adjacent a top wall of housing.

Embodiment 30. The device according to any preceding Embodiment, wherein the aperture of the inhalation outlet is formed in a region of an external surface of a sidewall of the housing that is located an edge of the housing where the sidewall of the housing meets the top wall of the housing.

Embodiment 31. The device according to any preceding Embodiment, wherein the inhalation outlet comprises an angled inhalation outlet conduit extending from the aperture to the upper interior chamber portion.

Embodiment 32. The device according to any preceding Embodiment, wherein the flow of gas introduced into the container creates an at least partly circular flow of gas about the container.

Embodiment 33. The device according to any preceding Embodiment, wherein the flow of gas introduced into the container has a primary component in either the clockwise or counter-clockwise direction.

Embodiment 34. The device according to any preceding Embodiment, wherein the angle of incidence is within a range of from 10° to 75°, from 30° to 60°, from 45° to 55°, and/or from 48° to 50°.

Embodiment 35. The device according to any preceding Embodiment, wherein the angle of incidence is no more than 60°, no more than 55°, and/or no more than 50°, and at least 5°, at least 8°, at least 10°, at least 15°, at least 20°, at least 25°, at least 30°, at least 35°, at least 40°, and/or at least 45°.

Embodiment 36. The device according to any preceding Embodiment, wherein the gas inlet is configured to direct the flow of gas downwardly towards an inner surface region of the one or more sidewalls of the container that is at least 2 mm, at least 2.5 mm, at least 3 mm, at least 5 mm, and/or at least 6 mm above the bottom wall of the container, and no more than 10 mm, no more than 7 mm, no more than 6 mm, no more than 5 mm, no more than 4 mm and/or no more than 3 mm above the bottom wall of the container.

Embodiment 37. The device according to any preceding Embodiment, wherein the gas inlet is configured to direct the flow of gas downwardly towards an inner surface region of the one or more sidewalls of the container that is between 2 mm to 7 mm, between 3 mm to 6 mm, and/or between 4 mm to 5 mm, above the bottom wall of the container.

Embodiment 38. The device according to any preceding Embodiment, wherein the horizontal component of the flow has an angle in a range of from 5 to 60 degrees with respect to an imaginary tangent line drawn through a point on the inner surface of the one or more container sidewalls that is (ia) in a horizontal plane at a point along the vertical height of the one or more container sidewalls and that is (ib) at a location along the circumference of the one or more sidewalls that is closest to the second opening of the gas inlet.

Embodiment 39. The device according to any preceding Embodiment, wherein the horizontal component has a horizontal angle in a range of from 40 degrees to 95 degrees with respect to an imaginary line from a point on the inner surface of the container closest to the gas inlet, to a point on the inner surface of the container directly opposing the second opening of the gas inlet.

Embodiment 40. The device according to any preceding Embodiment, wherein the surface region located on one or more sidewalls of the container to which the gas inlet is configured to direct the flow of gas, is located in a vertical range that is above or at about a same level as a level of vaporizable product held in the container.

Embodiment 41. The device according to any preceding Embodiment, wherein a portion of the mouthpiece creates a seal over the interior chamber so that the flow of gas can travel from the lower interior chamber to the upper interior chamber.

Embodiment 42. The device according to any preceding Embodiment, wherein the mouthpiece is directly over the container in the vertical direction.

Embodiment 43. The device of any preceding Embodiment, wherein the gas inlet comprises a curved conduit having a component of curvature in a horizontal plane to provide the flow of gas into the container.

Embodiment 44. The device according to any preceding Embodiment, wherein gas inlet comprises a curved conduit defining an at least partly spiral gas flow path.

Embodiment 45. The device according to any preceding Embodiment, wherein at least a portion of the conduit of the gas inlet is formed in an insert provided within the interior chamber.

Embodiment 46. The device according to any preceding Embodiment, wherein the portion of the conduit located in the insert is configured to receive gas introduced into the device via the first opening located on an external surface of the device housing.

Embodiment 47. The device according to any preceding Embodiment, wherein the portion of the conduit located in the gas insert receives a flow of gas from another portion of the conduit extending through the housing of the device and connected to first opening located in an external surface of the housing.

Embodiment 48. The device according to any preceding Embodiment, wherein the second opening of the gas inlet is located at a bottom surface of the insert.

Embodiment 49. The device according to any preceding Embodiment, wherein the insert is removably inserted into the upper chamber portion of the interior chamber of the device.

Embodiment 50. The device according to any preceding Embodiment, wherein the insert is affixed within the upper interior chamber portion of the interior chamber of the device.

Embodiment 51. The device according to any preceding Embodiment, wherein the gas inlet comprises a nozzle that extends into one or more of the upper portion of the interior chamber and the container.

Embodiment 52. The device according to any preceding Embodiment, wherein at least a portion, or all, of the conduit of the gas inlet is located vertically below the inhalation outlet of the mouthpiece.

Embodiment 53. The device according to any preceding Embodiment, wherein the first opening of the gas inlet is formed on an external surface of a sidewall of the housing, and wherein at least a portion of the conduit extends through the sidewall of the housing.

Embodiment 54. The device according to any preceding Embodiment, wherein the container is accessible for refill or repair by removal of the mouthpiece from a portion of the device having the container.

Embodiment 55. The device of any preceding Embodiment, wherein the device comprises a cap portion comprising the mouthpiece and a body portion, and wherein the cap portion is releasably sealable to the body portion.

Embodiment 56. The device of any preceding Embodiment, wherein the body portion is configured to receive the container.

Embodiment 57. The device according to any of Embodiments 55-56, wherein the cap portion comprises at least a portion, or all, of the gas inlet.

Embodiment 58. The device according to any of Embodiments 55-57, wherein the cap portion comprises at least a portion, or all, of the conduit of the gas inlet.

Embodiment 59. The device according to any of Embodiments 55-58, wherein the first opening of the gas inlet is formed on an external surface of the cap portion, and wherein at least a portion of the conduit connecting the first opening to the second opening extends through a section of the housing corresponding to the cap portion.

Embodiment 60. The device according to any of Embodiments 55-59, wherein the first opening is formed in a first region of an external surface of a sidewall of a portion of the housing corresponding to the cap portion.

Embodiment 61. The device according to any of Embodiments 55-60, wherein the inhalation outlet comprises an aperture formed in a second region of the external surface of a sidewall of a portion of the housing corresponding to the cap portion, or formed in an external surface of a top wall of a portion of the housing corresponding to the cap portion, and wherein the first opening is located vertically below the aperture of the inhalation outlet.

Embodiment 62. The device according to any of Embodiments 55-61, wherein the aperture of the inhalation outlet is formed in a region of an external surface of a sidewall of a portion of the housing corresponding to the cap portion that is adjacent a top wall of the portion of the housing corresponding to the cap portion.

Embodiment 63. The device according to any of Embodiments 55-62, wherein the aperture of the inhalation outlet is formed in a region of the external surface of a sidewall of a portion of the housing corresponding to the cap portion that is located at an edge of the portion of the housing corresponding to the cap portion where the sidewall meets the top wall of the portion of the housing corresponding to the cap portion.

Embodiment 64. The device according to any of Embodiments 55-63, wherein the inhalation outlet comprises an angled inhalation outlet conduit extending from the aperture to the upper interior chamber portion.

Embodiment 65. The device according to any of Embodiments 55-64, wherein the body portion comprises at least a portion of the gas inlet.

Embodiment 66. The device according to any of Embodiments 55-65, wherein the first opening of the gas inlet is formed in an external surface of a sidewall of a portion of the housing corresponding to the body portion.

Embodiment 67. The device according to any of Embodiments 55-66, wherein the inhalation outlet and the gas inlet are both located in the cap portion.

Embodiment 68. The device according to any of Embodiments 55-67, wherein the first opening and an aperture of the inhalation outlet are both located in the cap portion.

Embodiment 69. The device according to any of Embodiments 55-68, wherein the cap portion comprises the upper interior chamber portion of the interior chamber, and the body portion comprises the lower interior chamber portion of the interior chamber.

Embodiment 70. The device of any of Embodiments 55-69, wherein the cap portion is attached to the body portion by a flexible tether having a first end that extends from and is unitary with at least a part of either the cap portion or body portion, and a second end that is adhered to the other of the cap portion or body portion.

Embodiment 71. The device of any of Embodiments 55-70, wherein either the cap portion or the body portion comprises a snap connection to releasably seal the cap portion to the body portion, the snap connection comprising an annular rim on a cap portion housing or a body portion housing that is capable of mating with an annular recess on the other of the cap portion housing or the body portion housing.

Embodiment 72. The device of any of Embodiments 55-71, wherein the cap portion is releasable from the body portion by pulling the cap and body portions apart from one another at a side of the device that is opposite to a side where the cap and body portions are tethered together, and bending the tether portion to rotate the cap portion away from the body portion.

Embodiment 73. The device according to any of Embodiments 55-72, wherein a width of the annular rim of the snap connection is thinner on the side of the device where the cap and body portions are tethered together, and is thicker on the opposite side of the device where the cap portion and body portion can be pulled apart from one another.

Embodiment 74. The device according to any of Embodiments 55-73, wherein a width of the annular rim of the snap connection is cut away on the side of the device where the cap and body portions are tethered together.

Embodiment 75. The device according to any preceding Embodiment, wherein the upper and lower portions of the interior chamber are substantially continuous with one another, such that the flow of gas can pass substantially unimpeded downwardly from the second opening of the gas inlet and through the upper portion of the interior chamber to the container in the lower portion of interior chamber, and the flow of gas entrained with vaporized product can pass substantially unimpeded from the container in the lower portion of the interior chamber through the upper portion of the interior chamber and out of the inhalation outlet.

Embodiment 76. The device according to any preceding Embodiment, wherein an aperture of the inhalation outlet is located vertically above the first opening of the gas inlet, or the aperture of the inhalation outlet is located at about a same vertical level or below the first opening of the gas inlet.

Embodiment 77. The device according to any preceding Embodiment, wherein an aperture of the inhalation outlet is located vertically above the conduit of the gas inlet, or the aperture of the inhalation outlet is located at about a same vertical level or below at least a portion of the conduit of the gas inlet.

Embodiment 78. The device according to any preceding Embodiment, wherein the inhalation outlet is located towards a top of the device housing.

Embodiment 79. The device according to any preceding Embodiment, wherein the flow of gas directed by the gas inlet into the upper interior chamber portion, and the flow of gas entrained with vaporized product that flows out of the container and through the upper interior chamber portion towards the inhalation outlet, pass through a same volume of the upper interior chamber portion.

Embodiment 80. The device according to any preceding Embodiment, wherein the device comprises only a single gas inlet to introduce the flow of gas into the interior chamber.

Embodiment 81. The device according to any preceding Embodiment, wherein the container comprises embedded heater traces that extend at least partly vertically up the one or more sidewalls of the container.

Embodiment 82. The device according to any preceding Embodiment, wherein the embedded heater traces extend vertically to at most 80%, 75%, 70%, 60%, 65%, 55%, 50%, 45%, 40%, 35% and/or 30% of the height of the one or more sidewalls of the container.

Embodiment 83. The device according to any preceding Embodiment, wherein the bottom wall of the container has no heater traces embedded therein.

Embodiment 84. The device according to any of Embodiments 80-82, wherein the surface region located on one or more sidewalls of the container to which the gas inlet is configured to direct the flow of gas, is located in a vertical range that is above or at about a same level as the highest point of the embedded heater traces.

Embodiment 85. The device according to any preceding Embodiment, further comprising an insulating sleeve disposed about the container and between an external surface of the container and an internal surface of the housing, the insulating sleeve comprising one or more corrugated surfaces.

Embodiment 86. The device according to any preceding Embodiment, wherein the heating element is configured to be electrically connected to a battery.

Embodiment 87. The device according to any preceding Embodiment, wherein the device comprises a base portion, and wherein the base portion is configured to accommodate a power source.

Embodiment 88. The device according to any preceding Embodiment, wherein the device comprises a base portion, and wherein the base portion comprises a compartment configured to accommodate a battery.

Embodiment 89. The device according to any preceding Embodiment, wherein an aperture of the mouthpiece and the first opening of the gas inlet are both at least partly defined by a part of the housing about the upper interior chamber portion.

Embodiment 90. A method of using the electronic vaporizing device according to any preceding Embodiment, comprising:
providing vaporizable product to the container;
activating the heating element to heat the vaporizable product in the container to at least partly vaporize the product; and
inhaling gas entrained with the vaporizable product from the inhalation outlet of the mouthpiece.

Embodiment 91. The method according to Embodiment 90, wherein the method is performed in the absence of any movable physical structure in the container that would be capable of mechanically imparting kinetic energy to the vaporizable product in the container.

Embodiment 92. The method according to any of Embodiments 90-91, wherein the method is performed without the use of beads, pearls, balls, stirrers, or other mechanical objects in the container that would be capable of mechanically imparting kinetic energy to the vaporizable product in the container.

Embodiment 93. The method according to any of Embodiments 90-92, wherein the method is performed to direct the flow of gas from the gas inlet to the container substantially without ejecting vaporizable product in liquid form from the container into the upper interior chamber portion when it is contacted by the gas flow.

Embodiment 94. A vaporizing module for a vaporizing device, the vaporizing module comprising:
a housing comprising a cap portion comprising a portion of an upper interior chamber, and a body portion comprising a portion of a lower interior chamber, and wherein (i) the cap portion is releasably sealable to the body portion via an attachment feature, and (ii) the cap portion is connected to the body portion by a tether;
a mouthpiece having an inhalation outlet that is in communication with the upper interior chamber;
a container configured to receive a vaporizable product within the body portion of the housing, the container having one or more container sidewalls and a bottom wall, the container having a longitudinal axis extending along a vertical direction of the container, and a horizontal axis that is perpendicular to the longitudinal axis;
a heating element configured to be electrically connected to a power source to heat the product in the container and form a vapor therefrom during operation of the vaporizing device; and
a gas inlet comprising a first opening, a second opening, and a gas inlet conduit connecting the first opening to the second opening, wherein the first opening of the gas inlet is located in a region of an external surface of the housing that is vertically above the container when the cap portion is sealed to the body portion, and wherein the gas inlet is configured to introduce a flow of gas into the container of the vaporizing device, and
wherein the gas inlet is configured to direct the flow of gas downwardly with a vertical angle of at least 20° with respect to the horizontal axis, and towards an inner surface region of the container.

Embodiment 95. The vaporizing module according to Embodiment 94, wherein the inner surface region is on one or more sidewalls of the container.

Embodiment 96. The vaporizing module according to any of Embodiments 94-95, wherein the cap portion comprises at least a portion of the gas inlet.

Embodiment 97. The vaporizing module according to any of Embodiments 94-96, wherein the cap portion comprises the first opening, the second opening, and the conduit of the gas inlet.

Embodiment 98. The vaporizing module according to any of Embodiments 94-97, wherein the first opening of the gas inlet is formed on an external surface of the cap portion, and wherein at least a portion of the conduit connecting the first opening to the second opening extends through a section of a housing of the cap portion.

Embodiment 99. The vaporizing module according to any of Embodiments 94-98, wherein the first opening is formed in a first region of an external surface of a sidewall of a portion of the housing corresponding to the cap portion, and wherein the inhalation outlet comprises an aperture formed in a second region of the external surface of the sidewall of the portion of the housing corresponding to the cap portion, or formed in an external surface of a top wall of the portion of the housing corresponding to the cap portion, and wherein the first opening is located vertically below the aperture of the inhalation outlet.

Embodiment 100. The vaporizing module according to any of Embodiments 94-99, wherein the aperture of the inhalation outlet is formed in a region of the external surface of the sidewall of the portion of the housing corresponding to the cap portion that is adjacent a top wall of the portion of the housing corresponding to the cap portion.

Embodiment 101. The vaporizing module according to any of Embodiments 94-100, wherein the aperture of the inhalation outlet is formed in a region of the external surface of the sidewall of the portion of the housing corresponding to the cap portion that is located at an edge of the portion of the housing corresponding to the cap portion where the sidewall meets the top wall of the portion of the housing corresponding to the cap portion.

Embodiment 102. The vaporizing module according to any of Embodiments 94-101, wherein the inhalation outlet comprises an angled inhalation outlet conduit extending from the aperture to the upper interior chamber portion.

Embodiment 103. The vaporizing module according to any of Embodiments 94-102, wherein the first opening of the gas inlet is configured to introduce a flow of ambient gas into the cap portion from outside the cap portion.

Embodiment 104. The vaporizing module according to any of Embodiments 94-103, wherein the first opening of the gas inlet is located on an external surface of a portion of a housing of the cap portion, and introduces ambient gas from outside the cap portion into the gas inlet conduit.

Embodiment 105. The vaporizing module according to any of Embodiments 94-104, wherein at least a portion of the gas inlet conduit extends through a portion of a housing of the cap portion from the first opening to the second opening.

Embodiment 106. The vaporizing module according to any of Embodiments 94-105, wherein the first opening is located in a region of an external surface of a portion of the housing corresponding to the cap portion that is vertically above the container.

Embodiment 107. The vaporizing module according to any of Embodiments 94-106, wherein a portion of the housing corresponding to the cap portion defines an upper interior chamber portion, and wherein the gas inlet is configured to introduce gas into the upper interior chamber portion at a location that is located vertically above the container during operation of the device.

Embodiment 108. The vaporizing module according to any of Embodiments 94-107, wherein the gas inlet is configured to direct the flow of gas into the container from a second opening that is located vertically above the container during operation of the device.

Embodiment 109. The vaporizing module according to any of Embodiments 94-108, wherein the second opening introduces gas into the body portion at a location that is within the container.

Embodiment 110. The vaporizing module according to any of Embodiments 94-109, wherein the gas inlet conduit is angled downwardly from the first opening to the second opening.

Embodiment 111. The vaporizing module according to any of Embodiments 94-110, wherein the container has a longitudinal axis extending along a vertical direction of the vaporizing module, and a horizontal axis that is perpendicular to the longitudinal axis.

Embodiment 112. The vaporizing module according to Embodiment 111, wherein the conduit comprises a downward angle with respect to the horizontal axis that is at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62°.

Embodiment 113. The vaporizing module according to any of Embodiments 111-112, wherein the conduit comprises a downward angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

Embodiment 114. The vaporizing module according to any of Embodiments 111-113, wherein the flow of gas directed by the gas inlet into the container has a median flow with a downward angle with respect to the horizontal axis that is at least 22°, at least 24°, at least 26°, at least 28°, at least 30°, at least 32°, at least 34°, at least 36°, at least 38°, at least 40°, at least 42°, at least 44°, at least 46°, at least 48°, at least 50°, at least 52°, at least 54°, at least 56°, at least 58°, at least 60°, and/or at least 62°.

Embodiment 115. The vaporizing module according to any of Embodiments 111-114, wherein the flow of gas directed by the gas inlet into the container has a median flow with a downward angle with respect to the horizontal axis that is no more than 70°, no more than 68°, no more than 66°, no more than 64°, no more than 62°, no more than 60°, no more than 58°, no more than 56°, no more than 54°, no more than 52°, no more than 50°, no more than 48°, no more than 46°, no more than 44°, no more than 42°, no more than 40°, no more than 38°, no more than 36°, no more than 34°, no more than 32°, no more than 30°, no more than 28°, no more than 26°, and/or no more than 24°.

Embodiment 116. The vaporizing module according to any of Embodiments 111-115, wherein the downward angle of the flow of gas is imparted by a downward angle of the conduit.

Embodiment 117. The vaporizing module according to any of Embodiments 111-116, wherein the downward angle of the flow of gas is imparted by a directing structure that is adjacent the second opening and that directs the flow of gas exiting the second opening downwardly into the container.

Embodiment 118. The vaporizing module according to any of Embodiments 94-117, wherein the module comprises from one to three gas inlets, from one to two gas inlets, or a single gas inlet.

Embodiment 119. The vaporizing module according to any of Embodiments 94-118, wherein gas inlet conduit has a height measured in a vertical direction parallel to the longitudinal axis, from the first opening to the second opening, at is at least 4 mm, at least 4.5 mm, at least 5 mm at least 5.5 mm, at least 6 mm, at least 6.5 mm, at least 7 mm, at least 7.5 mm, and/or at least 8 mm, and less than 10 mm, less than 9.5 mm, less than 9 mm, less than 8.5 mm, less than 8 mm, less than 7.5 mm, less than 7 mm, less than 6.5 mm, less than 6 mm, less than 5.5 mm and/or less than 5 mm.

Embodiment 120. The vaporizing module according to any of Embodiments 94-119, wherein the gas inlet comprises a gas path length from the first opening to the second opening of at least 4 mm, at least 4.5 mm, at least 5 mm at least 5.5 mm, at least 6 mm, at least 6.5 mm, at least 7 mm, at least 7.5 mm, and/or at least 8 mm, and less than 10 mm, less than 9.5 mm, less than 9 mm, less than 8.5 mm, less than 8 mm, less than 7.5 mm, less than 7 mm, less than 6.5 mm, less than 6 mm, less than 5.5 mm and/or less than 5 mm.

Embodiment 121. The vaporizing module of any of Embodiments 94-120, wherein cap portion is configured to remain tethered to the body portion upon removal of the cap portion from the body portion, and wherein removal of the cap portion provides access to the container for refilling with vaporizable product.

Embodiment 122. The vaporizing module of any of Embodiments 94-121, wherein the tether is connected to the cap portion on a side of the cap portion that is opposite a side where the inhalation outlet is located.

Embodiment 123. The vaporizing module of any of Embodiments 94-122, wherein the inhalation outlet is not obstructed or blocked by tethering of the cap portion to the body portion.

Embodiment 124. The vaporizing module of any of Embodiments 94-123, wherein the tether connects to an insulating sleeve of the body portion that has corrugated ribs on an interior surface thereof.

Embodiment 125. The vaporizing module of any of Embodiments 94-124, wherein the attachment feature is a snap connection.

Embodiment 126. The vaporizing module of any of Embodiments 94-125, wherein the snap connection comprises one or more at least partly circumferential ribs on the cap portion or the body portion, that are complementary to and capable of engaging with one or more at least partly circumferential recesses in the other of the cap portion or the body portion.

Embodiment 127. The vaporizing module of any of Embodiments 94-126, wherein the mouthpiece acts as a cap for the container.

Embodiment 128. The vaporizing module of any of Embodiments 94-127, wherein the module is configured to attach to a base portion to together form a part of a vaporizing device, the base portion having a compartment configured to contain a battery.

Embodiment 129. The vaporizing module of any of Embodiments 94-128, wherein the body portion has a cutout to accommodate the tether, and the tether is substantially flush with the body portion when the body portion and cap portion are in a closed position.

Embodiment 130. The vaporizing module according to Embodiment 129, wherein the cutout extends at least partly along a length of the body portion, and to an interface of the body portion with the cap portion, to accommodate the tether in a substantially flush configuration against a side of the body portion.

Embodiment 131. The vaporizing module of any of Embodiments 94-130, wherein the tether is unitary with an insulating sleeve comprising silicone that forms at least a portion of a housing for the body portion or the cap portion.

Embodiment 132. An electronic vaporizing device comprising the vaporizing module of any of Embodiments 94-131.

Embodiment 133. The electronic vaporizing device, module, or method according to any of the preceding Embodiments, wherein a volume of the lower interior chamber portion located between sidewalls of the container and sidewalls of the housing is at least partly occupied by a thermally insulating sleeve.

Embodiment 134. The electronic vaporizing device, module, or method according to any of the preceding Embodiments, wherein a section of the upper interior chamber portion above the container has an open volume with a width or diameter D1 as measured in a first horizontal plane that is at least 6 mm, at least 6.25 mm, at least 6.5 mm, at least 6.75 mm, at least 7 mm, at least 7.25 mm, at least 7.5 mm, at least 7.75 mm, at least 8 mm, at least 8.25 mm, at least 8.5 mm, at least 8.75 mm, at least 9 mm, at least 9.25 mm, at least 9.5 mm, at least 9.75 mm, at least 10 mm, at least 10.25 mm, at least 10.5 mm, at least 10.75 mm, at least 11 mm, at least 11.25 mm, at least 11.5 mm, at least 11.75 mm, and/or at least 12 mm, and no more than 15 mm, no more than 14 mm, no more than 13 mm, no more than 12 mm, no more than 11 mm, no more than 10 mm, and/or no more than 9 mm.

Embodiment 135. The electronic vaporizing device, module, or method according to any of the preceding Embodiments, wherein the container has a width or diameter D2 as measured in a second horizontal plane that is vertically below the first horizontal plane, and wherein a ratio of D1:D2 is at least 0.5, at least 0.6, at least 0.7, at least 0.8, at least 0.9, at least 0.95, and/or at least 1, and no more than 3, no more than 2, and/or no more than 1.

Embodiment 136. The electronic vaporizing device, module, or method according to Embodiment 133, wherein the first horizontal plane D1 is one or more of (i) directly above a top of the container, or (ii) less than 1 mm, less than 0.5 mm, less than 0.25 mm, less than less than 0.1 mm, less than 0.05 mm vertically above D2.

Embodiment 137. The electronic vaporizing device, module or method according to any preceding Embodiment, wherein the inhalation outlet comprises a first aperture formed in an external surface of the mouthpiece, through which gas having the vaporizable product entrained therein flows out of the device, and wherein the first aperture is offset from a longitudinal axis of the container.

Embodiment 138. The electronic vaporizing device, module or method according to any preceding Embodiment, wherein the inhalation outlet comprises a first aperture formed in a region of an external surface of a sidewall of a portion of the housing corresponding to the mouthpiece.

Embodiment 139. The electronic vaporizing device, module or method according to any preceding Embodiment, wherein the inhalation outlet comprises a first aperture formed in a region of an external surface of a sidewall of the housing that is adjacent a top wall of the housing.

Embodiment 140. The electronic vaporizing device, module or method according to any preceding Embodiment, wherein the inhalation outlet comprises a first aperture formed in a region of an external surface of a sidewall of the housing that located at an edge where the sidewall meets a top wall of the housing.

Embodiment 141. The electronic vaporizing device, module or method according to any preceding Embodiment, wherein the inhalation outlet comprises a first aperture to flow gas out of the device, a second aperture in communication with the upper interior chamber portion to receive the flow of gas having vaporized product entrained therein that flows from the container into the upper interior chamber portion, and a conduit connecting the second aperture to the first aperture, wherein at least a part of the conduit is angled away from the longitudinal axis from the second aperture to the first aperture.

Embodiment 142. The electronic vaporizing device, module or method according to any preceding embodiment, wherein the inhalation outlet is configured to re-direct the flow of gas having vaporized product entrained therein that flows from the container into the upper interior chamber portion, in a direction away from the longitudinal axis.

Embodiment 143. The electronic vaporizing device, module or method according to any preceding embodiment, wherein the inhalation outlet is configured to re-direct the flow of the gas in the direction away from the longitudinal axis by flowing the gas through a conduit that is angled away from the longitudinal axis, or by flowing the gas towards a baffle that re-directs the flow.

What is claimed is:

1. An electronic vaporizing device comprising:
a vaporizing module comprising:
a housing defining an interior chamber having an upper interior chamber portion and a lower interior chamber portion;
a mouthpiece having an inhalation outlet in communication with the upper interior chamber portion;
a container configured to receive a vaporizable product within the lower interior chamber portion of the interior chamber, the container having one or more container sidewalls and a bottom wall, and the container having a longitudinal axis extending along a vertical direction of the electronic vaporizing device, and a horizontal axis that is perpendicular to the longitudinal axis;
a heating element configured to be electrically connected to a power source to heat the product and form a vapor therefrom; and
a gas inlet configured to introduce a flow of gas into the container, the gas inlet comprising a first opening, a second opening, and a gas inlet conduit connecting the first opening to the second opening,
wherein the gas inlet is configured to direct the flow of gas (i) downwardly with a vertical angle of from 20° to 70° with respect to the horizontal axis, and towards an inner surface region of the container, and (ii) with a horizontal component of the flow having an angle of incidence that is within a range of from 5 to 60 degrees,
wherein the angle of incidence corresponds to the angle between the median of the horizontal component of the flow directed towards the inner surface region, with respect to an imaginary tangent line drawn through a point that intersects with the inner surface region, as measured in a horizontal plane taken at a vertical height of the container that contains the point of intersection, wherein in an open state, an upper housing portion that at least partly defines the upper interior chamber portion is removed from a lower housing portion that at least partly defines the lower interior chamber portion, to provide access to the container, and in a closed state the upper housing portion is sealed to the lower housing portion, and a base portion that is removably attachable to the vaporizing module, the base portion housing one or more components for electrically connecting to the power source to supply power to the heating element, wherein the vaporizing module can be removed from the base portion while the vaporizing module is in the closed state, and wherein in operation of the electronic vaporizing device, vaporizable product received in the container is heated by the heating element, becomes entrained in the flow of gas directed by the gas inlet into the container, and the flow of gas having the vaporized product entrained therein flows out of the container and through the upper portion interior chamber portion to flow out of the inhalation outlet of the mouthpiece.

2. The device according to claim 1, wherein the gas inlet is configured to direct the flow of gas downwardly towards an inner surface region of one or more sidewalls of the container that is between 1 mm to 10 mm above the bottom wall of the container.

3. The device according to claim 1, wherein the gas inlet is configured to direct the flow of gas downwardly towards an inner surface region of one or more sidewalls of the container, the inner surface region of the one or more sidewalls being located in a vertical range that is above or at about a same level as a level of the vaporizable product held in the container.

4. The device according to claim 1, wherein the horizontal component has a horizontal angle in a range of from 40 degrees to 95 degrees with respect to an imaginary line from a point on the inner surface of the container closest to the gas inlet, to a point on the inner surface of the container directly opposing the second opening of the gas inlet.

5. The device according to claim 2, wherein the gas inlet is configured to direct the flow of gas downwardly towards the inner surface region of the one or more sidewalls of the container that is between 2 mm to 7 mm above the bottom wall of the container.

6. The device according to claim 1, wherein the device is configured to generate vapor from the vaporizable product by directing the flow of gas from the gas inlet to the container substantially without ejecting the vaporizable product in liquid form from the container into the upper interior chamber portion when it is contacted by the gas flow.

7. The device according to claim 1, wherein the device is configured to generate vapor from the vaporizable product without the presence in the container of any movable physical structure capable of mechanically imparting kinetic energy to the vaporizable product in the container.

8. The device according to claim 1, wherein the second opening of the gas inlet that directs the flow of gas into the container is located above the container.

9. The device according to claim 1, wherein the second opening introduces gas into the lower interior chamber portion at a location that is within the container.

10. The device according to claim 1, wherein the gas inlet conduit is angled downwardly from the first opening to the second opening of the gas inlet.

11. The device according to claim 1, wherein the flow of gas directed by the gas inlet into the container has a median flow with a downward angle with respect to the horizontal axis that is at least 30°.

12. The device according to claim 11, wherein the flow of gas directed by the gas inlet into the container has a median flow with a downward angle with respect to the horizontal axis that is no more than 60°.

13. The device according to claim 11, wherein the downward angle of the flow of gas is imparted by a directing structure that is adjacent the second opening of the gas inlet and that directs the flow of gas exiting the second opening of the gas inlet downwardly into the container.

14. The device according to claim 1, wherein the flow of gas introduced into the container creates an at least partly circular flow of gas about the container.

15. The device according to claim 1, wherein the angle of incidence is within a range of from 30° to 60°.

16. The device according to claim 1, wherein the gas inlet comprises a curved conduit having a component of curvature in a horizontal plane to provide the flow of gas into the container.

17. The device according to claim 1, wherein gas inlet comprises a curved conduit defining an at least partly spiral gas flow path.

18. The device according to claim 1, wherein at least a portion of the gas inlet conduit is formed in an insert provided within the interior chamber.

19. The device according to claim 18, wherein the portion of the gas inlet conduit located in the insert is configured to receive gas introduced into the device via the first opening of the gas inlet located on an external surface of the device housing.

20. The device according to claim 18, wherein the portion of the gas inlet conduit located in the insert receives a flow of gas from another portion of the gas inlet conduit extending through the housing of the device and connected to first opening of the gas inlet located in an external surface of the housing.

21. The device according to claim 18, wherein the second opening of the gas inlet is located at a bottom surface of the insert.

22. The device according to claim 18, wherein the insert is removably inserted into the upper interior chamber portion of the interior chamber of the device.

23. The device according to claim 18, wherein the insert is affixed within the upper interior chamber portion of the interior chamber of the device.

24. The device according to claim 1, wherein the gas inlet comprises a nozzle that extends into one or more of the upper interior chamber portion of the interior chamber and the container.

25. The device according to claim 1, wherein the device comprises a cap portion comprising the mouthpiece and a body portion, and wherein the cap portion is releasably sealable to the body portion.

26. The device according to claim 25, wherein the cap portion comprises at least a portion of the gas inlet.

27. The device according to claim 25, wherein the cap portion is attached to the body portion by a flexible tether having a first end that extends from and is unitary with at least a part of either the cap portion or body portion, and a second end that is adhered to the other of the cap portion or body portion.

28. The device according to claim 25, wherein either the cap portion or the body portion comprises a snap connection to releasably seal the cap portion to the body portion, the snap connection comprising an annular rim on a cap portion housing or a body portion housing that is capable of mating with an annular recess on the other of the cap portion housing or the body portion housing.

29. The device according to claim 1, wherein an aperture of the inhalation outlet is located vertically above the first opening of the gas inlet, or the aperture of the inhalation outlet is located at about a same vertical level or below the first opening of the gas inlet.

30. A method of using the electronic vaporizing device according to claim 1, comprising:
  providing a vaporizable product to the container;
  activating the heating element to heat the vaporizable product in the container to at least partly vaporize the vaporizable product; and
  inhaling gas entrained with the vaporized product from the inhalation outlet of the mouthpiece.

\* \* \* \* \*